US012339499B2

(12) United States Patent
Tanaka et al.

(10) Patent No.: US 12,339,499 B2
(45) Date of Patent: Jun. 24, 2025

(54) LENS, LENS AND OPTICAL FIBER ASSEMBLY, AND OPTICAL COMMUNICATION SYSTEM

(71) Applicant: HOSIDEN CORPORATION, Yao (JP)

(72) Inventors: Akihiro Tanaka, Yao (JP); Shuhei Tsubota, Yao (JP); Kosuke Sasada, Yao (JP); Hayato Kondo, Yao (JP)

(73) Assignee: Hosiden Corporation, Yao (JP)

( * ) Notice: Subject to any disclaimer, the term of this patent is extended or adjusted under 35 U.S.C. 154(b) by 302 days.

(21) Appl. No.: 18/127,842

(22) Filed: Mar. 29, 2023

(65) Prior Publication Data

US 2023/0367076 A1 Nov. 16, 2023

(30) Foreign Application Priority Data

May 11, 2022 (JP) .................................. 2022-078297

(51) Int. Cl.
*H04B 10/00* (2013.01)
*G02B 6/32* (2006.01)
*G02B 6/36* (2006.01)
*G02B 6/42* (2006.01)

(52) U.S. Cl.
CPC .......... *G02B 6/322* (2013.01); *G02B 6/3652* (2013.01); *G02B 6/4206* (2013.01)

(58) Field of Classification Search
CPC ..... G02B 6/322; G02B 6/3652; G02B 6/4206
See application file for complete search history.

(56) References Cited

U.S. PATENT DOCUMENTS

| 6,240,235 B1* | 5/2001 | Uno ..................... G02B 6/3839 |
| | | 385/83 |
| 9,423,561 B1* | 8/2016 | Chou ....................... G02B 6/30 |
| 11,402,586 B2* | 8/2022 | Haase .................. G02B 6/3885 |
| 2001/0021301 A1* | 9/2001 | Fukuyama ........... G02B 6/3684 |
| | | 264/1.25 |
| 2014/0066756 A1* | 3/2014 | Sinclair ................ A61B 5/0077 |
| | | 264/1.24 |
| 2014/0178010 A1* | 6/2014 | de Jong ................. G02B 6/428 |
| | | 359/652 |

(Continued)

FOREIGN PATENT DOCUMENTS

| JP | 08-220377 A | 8/1996 |
| JP | 2001-004863 A | 1/2001 |

*Primary Examiner* — Agustin Bello
(74) *Attorney, Agent, or Firm* — Kilyk & Bowersox, P.L.L.C.

(57) ABSTRACT

A lens including a lens body and a support. The lens body includes at least one lens portion and at least one holding hole for holding at least one optical fiber. A central axis of the or each holding hole is positioned on a phantom line extending through an optical axis of the or a corresponding lens portion. The support includes a support body fixed to the lens body. With a first portion of the or each optical fiber securely received in the or a corresponding holding hole, a bottom face of the or each holding hole abuts an end face of the first portion of the or a corresponding optical fiber, a peripheral face of the or each holding hole partly abuts an outer peripheral face of the first portion of the or a corresponding optical fiber, and the support body supports a second portion of the or each optical fiber.

12 Claims, 17 Drawing Sheets

(56) References Cited

U.S. PATENT DOCUMENTS

| | | | |
|---|---|---|---|
| 2022/0308293 A1* | 9/2022 | Li | G02B 6/4249 |
| 2022/0310566 A1* | 9/2022 | Li | G02B 6/4249 |
| 2023/0367076 A1* | 11/2023 | Tanaka | G02B 6/4206 |
| 2024/0298880 A1* | 9/2024 | Aiba | G02B 6/3821 |

* cited by examiner

LENS, LENS AND OPTICAL FIBER ASSEMBLY, AND OPTICAL COMMUNICATION SYSTEM

CROSS-REFERENCE TO RELATED APPLICATIONS

The present application claims priority under 35 U.S.C. § 119 of Japanese Patent Application No. 2022-078297 filed on May 11, 2022, the disclosure of which is expressly incorporated by reference herein in its entirety.

BACKGROUND OF THE INVENTION

Technical Field

The invention relates to a lens, a lens and optical fiber assembly, and an optical communication system.

Background Art

Japanese Unexamined Patent Publication No. H8-220377 discloses a lens to which a distal portion of a single-mode optical fiber can be attached. The lens is made of a transparent synthetic resin. The lens has an aspherical front face and a flat rear face. The rear face of the lens has a cylindrical holding hole extending forward and opening out backward. The holding hole is configured to securely receive the distal portion of the optical fiber. With the distal portion of the optical fiber securely received in the holding hole, the distal portion of the optical fiber can be bonded to the lens so that the optical fiber is fixed to the lens.

Japanese Unexamined Patent Publication No. 2001-4863 discloses an arrangement member for optical fibers. The arrangement member includes a plurality of first positioning grooves for securely positioning a plurality of first optical fibers and a plurality of second positioning grooves for securely positioning a plurality of second optical fibers. The first positioning grooves are provided in a face of the arrangement member, extend in the longitudinal direction of the first optical fibers, and are arranged at spaced intervals along an orthogonal direction substantially orthogonal to the longitudinal direction. The second positioning grooves are provided in the face of the arrangement member, extend in the longitudinal direction, and are arranged at the same intervals as the first positioning grooves along the orthogonal direction. In a state where the first optical fibers are received in the corresponding first positioning grooves and the second optical fibers are received in the corresponding second positioning grooves, the rear end faces of the first optical fibers are opposed, in the longitudinal direction, to the front end faces of the second optical fibers. In this state, synthetic resin is applied onto the face of the arrangement member, and the first and second optical fibers are fixed to the arrangement member with the synthetic resin. The first optical fibers are graded-index optical fibers to be used as rod lenses. The second optical fibers are single-mode optical fibers.

SUMMARY OF INVENTION

Since the conventional lens is configured to securely receive the distal portion of the optical fiber in the holding hole of the lens, there is a possibility that the optical fiber may fall out of the holding hole under its own weight, or the optical axis of the optical fiber becomes inclined or displaced, during the time from the insertion to the bonding of the distal portion of the optical fiber into the holding hole. Therefore, the conventional lens has a poor workability in attaching optical fibers thereinto. In addition, the tilt or displacement of the optical axis of the optical fiber would deteriorate the reliability of optical communication characteristics using the conventional lens.

The conventional arrangement member also has a poor workability in attaching optical fibers thereinto for the following reason. The arrangement member is configured to simply receive the first optical fibers in the corresponding first positioning grooves and the second optical fibers in the corresponding second positioning grooves. Such configuration poses a possibility that the first optical fibers may move in the first positioning grooves along the longitudinal direction or fall out of the first positioning grooves, and a possibility that the second optical fibers may move in the second positioning grooves along the longitudinal direction or fall out of the second positioning grooves, due to the vibrations applied to the arrangement member or other causes before the first and second optical fibers are bonded to the arrangement member.

The invention provides a lens, a lens and optical fiber assembly, and an optical communication system with a reduced deterioration in the reliability of optical communication characteristics and with improved workability in attaching an optical fiber to the lens.

A lens according to an aspect of the invention includes a lens body and a support. The lens body includes at least one lens portion and at least one holding hole for holding at least one optical fiber. The or each lens portion is provided in the lens body so as to be positioned on one side in a first direction relative to the or a corresponding holding hole. The or each holding hole is provided in the lens body, is a blind hole of cylindrical shape extending in the first direction and opening out to the other side in the first direction. The or each holding hole includes a bottom face on the one side in the first direction and a peripheral face of tubular shape with a circular section extending from the bottom face to the other side in the first direction. A central axis of the or each holding hole is positioned on a phantom line extending in the first direction through an optical axis of the or a corresponding lens portion. The or each holding hole has a cross-sectional diameter along second and third directions that is substantially equal to a cross-sectional outer diameter along the second and third directions of a first portion of the or a corresponding optical fiber, the first portion being a distal portion on the one side in the first direction of the or each optical fiber. The first direction is an axial direction of the central axis of the at least one holding hole. The second direction is substantially orthogonal to the first direction. The third direction is substantially orthogonal to the first and second directions. The support includes a support body fixed to the lens body. The support body is positioned on the other side in the first direction relative to the lens body, and positioned at least partly on one side in the second direction relative to the at least one holding hole of the lens body. With the first portion of the or each optical fiber securely received in the or a corresponding holding hole, the bottom face of the or each holding hole abuts an end face on the one side in the first direction of the first portion of the or a corresponding optical fiber, the peripheral face of the or each holding hole partly abuts an outer peripheral face of the first portion of the or a corresponding optical fiber, and the support body supports a second portion of the or each optical fiber from the one side in the second direction, the second portion being positioned on the other side in the first direction relative to the first portion of the or a corresponding optical fiber.

The lens of this aspect provides an improved workability in attaching the at least one optical fiber to the lens and a reduced deterioration in the reliability of optical communication characteristics using the lens for the following reasons. The central axis of the or each holding hole is positioned on the phantom line extending in the first direction through the optical axis of the or a corresponding lens portion. When the first portion of the or each optical fiber is inserted into the or a corresponding holding hole so that that the end face on the one side in the first direction of the first portion of the or each optical fiber is brought into abutment with the bottom face of the or a corresponding holding hole, the outer peripheral face of the first portion of the or each optical fiber abuts the peripheral face of the at least one holding hole, and the second portion of the or each optical fiber is supported by the support body from the one side in the second direction. The configurations reduce the possibility that the at least one optical fiber falls out of the at least one holding hole under its own weight, and/or that the optical axis of the at least one optical fiber is inclined, and prevent the at least one optical fiber from moving to the one side in the first direction. It is therefore possible to improve the workability of attachment and make it easier to match the optical axis of the or each optical fiber with the optical axis of the or a corresponding lens portion, resulting in reduced deterioration in the reliability of optical communication characteristics using the lens.

The support body may be provided with at least one guide, the or each guide being configured to guide the first portion of the or a corresponding optical fiber along the first direction into the or a corresponding holding hole. The or each guide may be positioned on the other side in the first direction relative to the or a corresponding holding hole. With the first portion of the or each optical fiber securely received in the or a corresponding holding hole, the or each guide of the support body may support the second portion of the or a corresponding optical fiber from the one side in the second direction. With the first portion of the or each optical fiber securely received in the or a corresponding holding hole, the or each guide of the support body may guide the second portion of the or a corresponding optical fiber in the third direction.

The or each guide may be a long groove extending in the first direction, and may open out to the other side in the second direction and to the other side in the first direction. The or each long groove may have a dimension in the third direction that is substantially equal to, or smaller than, a diameter of a peripheral edge of the or a corresponding holding hole. Alternatively, the or each guide may be a pair of ridges extending in the first direction, and a distance in the third direction between the ridges of the or each guide may be substantially equal to the diameter of the peripheral edge of the or a corresponding holding hole.

A dimension in the first direction of the or each guide and a dimension in the first direction of the support body may be larger than, equal to, or smaller than, a dimension in the first direction of the or a corresponding holding hole.

Even where the at least one guide is omitted, the dimension in the first direction of the support body may be larger than, equal to, or smaller than, the dimension in the first direction of the at least one holding hole.

The or each holding hole may include a hole body, which may include the bottom face and the peripheral face of the or each holding hole, and a guide hole of a truncated-cone shape extending from the hole body to the other side in the first direction. The hole body of the or each holding hole may have a cross-sectional outer diameter along the second and third directions that is substantially equal to a cross-sectional outer diameter along the second and third direction of the first portion of the or a corresponding optical fiber. The guide hole of the or each holding hole may have a cross-sectional outer diameter along the second and third directions that gradually decreases in moving to the one side in the first direction.

The lens body may include a first face on the one side in the first direction, a second face on the other side in the first direction, a third face on the one side in the second direction, and a fourth face on the other side in the second direction.

The support body may be formed separately from the lens body. In this case, the support body may include a first face on the one side in the first direction, a second face on the other side in the first direction, a third face on the one side in the second direction, and a fourth face on the other side in the second direction The support may further include a fixing portion extending from the first face of the support body to the one side in the first direction, the fixing portion may be fixed to the fourth face of the lens body, and the support body may be fixed to the second face of the lens body. Where the fixing portion is omitted, the support body may be fixed to the second face of the lens body.

The support body may be integrated with, and fixed to, the lens body. In this case, the support body may extend from the lens body to the other side in the first direction, and the first face of the support body may be omitted.

The lens body may be made of a synthetic resin, or of other material, such as a glass.

The at least one lens portion, the at least one holding hole, and the at least one guide may be an equal number of a plurality of lens portions, a plurality of holding holes, and a plurality of guides, respectively. The lens portions may be arranged at spaced intervals in the third direction. The holding holes may be arranged at spaced intervals in the third direction and positioned on the other side in the first direction relative to the respective lens portions. The guides may be arranged at spaced intervals in the third direction and positioned on the other side in the first direction relative to the respective holding holes.

An assembly according to an aspect of the invention may include the lens of any one of the above aspects, at least one optical fiber, and a bonding member.

The or each optical fiber may include a first portion and a second portion. The first portion may be a distal portion on the one side in the first direction of the or each optical fiber. The second portion may be a portion, on the other side in the first direction relative to the first portion, of the or each optical fiber. With the first portion of the or each optical fiber securely received in the or a corresponding holding hole, the bottom face of the or each holding hole may abut an end face on the one side in the first direction of the first portion of the or a corresponding optical fiber, the peripheral face of the or each holding hole may partly abut an outer peripheral face of the first portion of the or a corresponding optical fiber, and the support body may support the second portion of the or a corresponding optical fiber from the one side in the second direction.

Where the support body is provided with the at least one guide, with the first portion of the or each optical fiber securely received in the or a corresponding holding hole, the or each guide of the support body may support the second portion of the or a corresponding optical fiber from the one side in the second direction.

The bonding member is only required to bond the second portion of the or each optical fiber to the support body. For example, the bonding member may be provided on the third face of the support body, and the second portion of the or each optical fiber, and may bond the second portion of the or a corresponding optical fiber to the third face of the support body. The bonding member may be provided also on the second face of the lens body, and may bond the second portion of the or each optical fiber not only to the third face of the support body, but also to the second face of the lens body. In this case, the bonding member may enter an interstice between, and bond together, the peripheral face of the or each holding hole and the outer peripheral face of the first portion of the or a corresponding optical fiber securely received in the or each holding hole. Where the support body is provided with the at least one guide, the bonding member may also bond with the at least one guide.

The bonding member is colored in a color that is different from a color of at least one of the lens body or the support. Alternatively, the bonding member, the lens body, and the support may be colored in the same color.

An optical communication system of an aspect of the invention includes a first assembly, which is the assembly of any of the above aspects, and a second assembly, which is the assembly of any of the above aspects. The at least one lens portion of the first assembly is placed so as to face the at least one lens portion of the second assembly.

An optical communication system of an aspect of the invention may include a male connector and a female connector. The male connector may include a first assembly, which is the assembly of any of the above aspects, and at least one first terminal. The female connector preferably includes a second assembly, which is the assembly of any of the above aspects, and at least one second terminal. The male connector may be connected to the female connector. The at least one lens portion of the first assembly of the male connector may face the at least one lens portion of the second assembly of the female connector. The at least one first terminal of the male connector may be in contact with the at least one second terminal of the female connector.

Figure 1A:
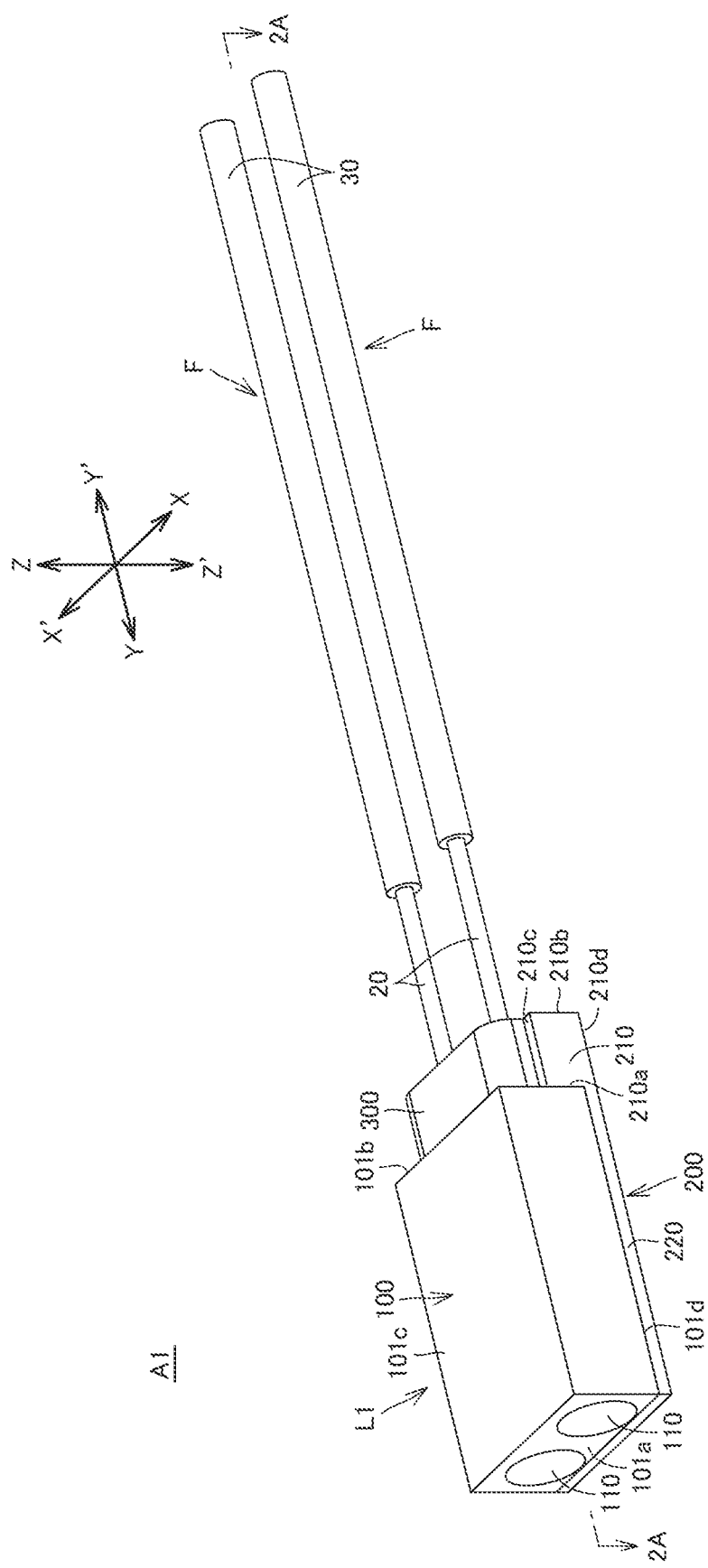
FIG. 1A is a front, top, right side perspective view of a lens and optical fiber assembly according to the first embodiment of the invention.
Figure 1B:
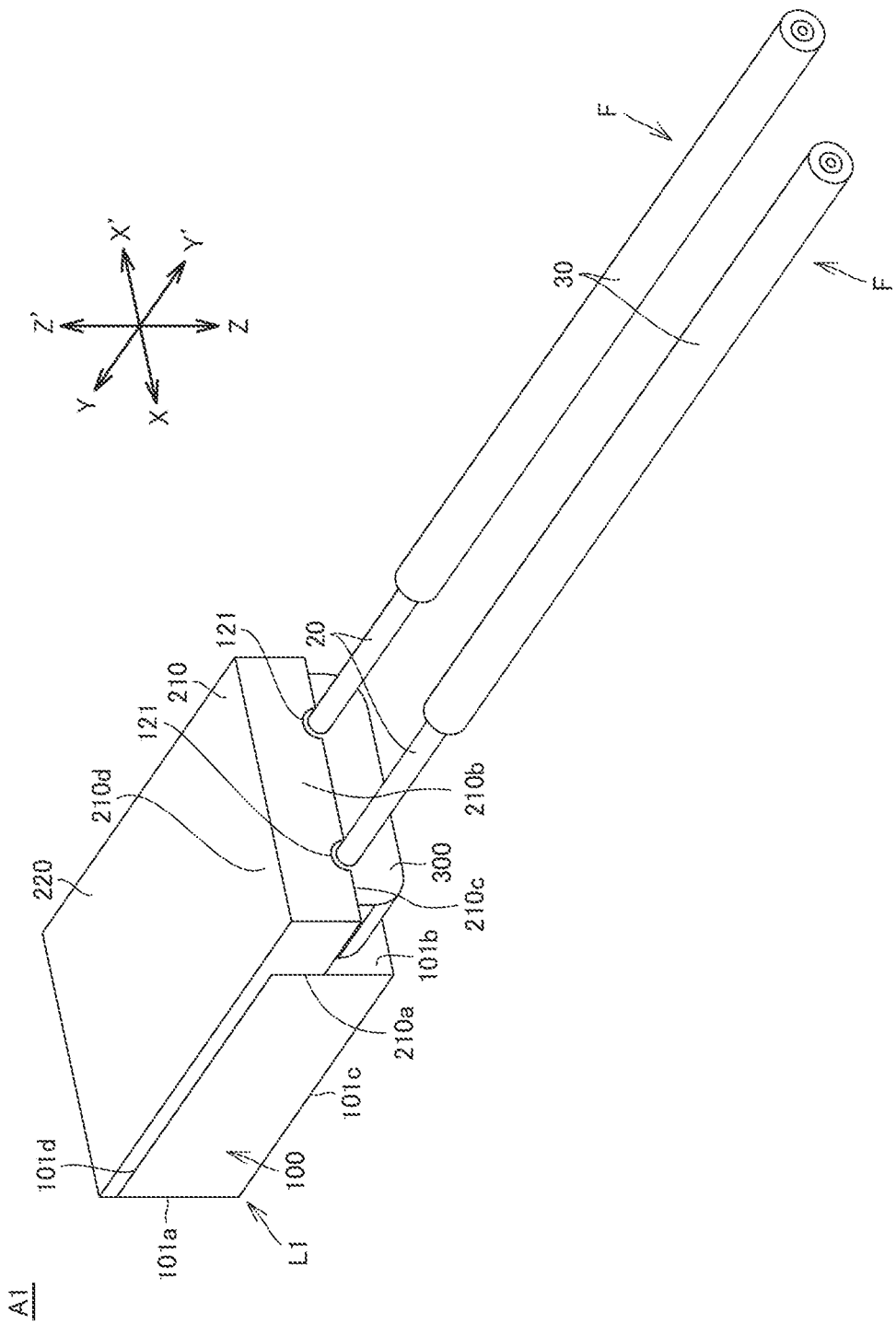
FIG. 1B is a rear, bottom, left side perspective view of the assembly.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the lens, the lens and optical fiber assembly, and the optical communication system, as well as their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Hereinafter described are a plurality of embodiments, including first and second embodiments and variants thereof, of the invention. It should be noted that constituents of the embodiments and their variants to be described can be combined in any possible manner. It should also be noted that the materials, the shapes, the dimensions, the numbers, the arrangements, etc. of constituents of the embodiments and their variants to be described are presented by way of example only and can be modified in any manner as long as the same functions can be fulfilled.

First Embodiment

Figure 5A:
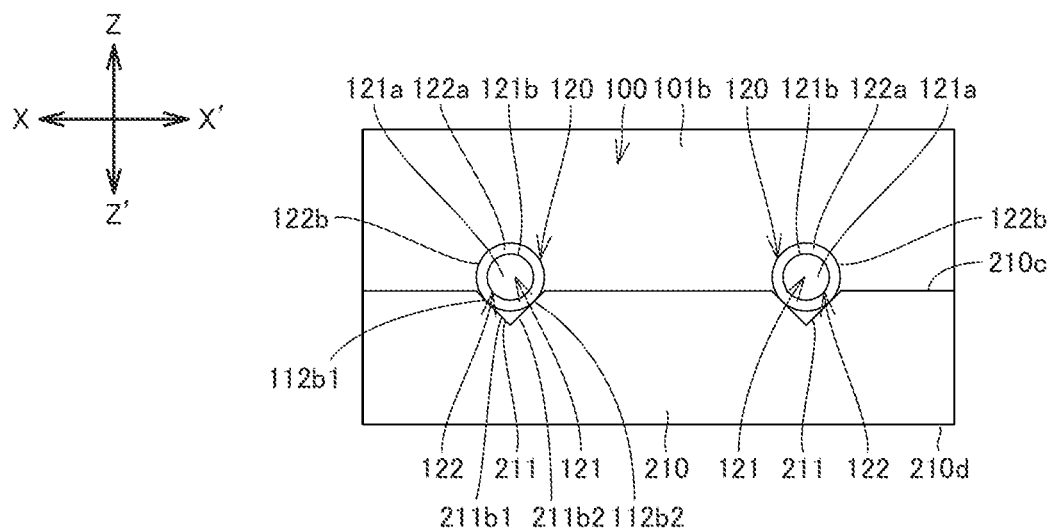
FIG. 5A is an enlarged rear view of a first variant of the lens of the assembly.
Figure 5B:
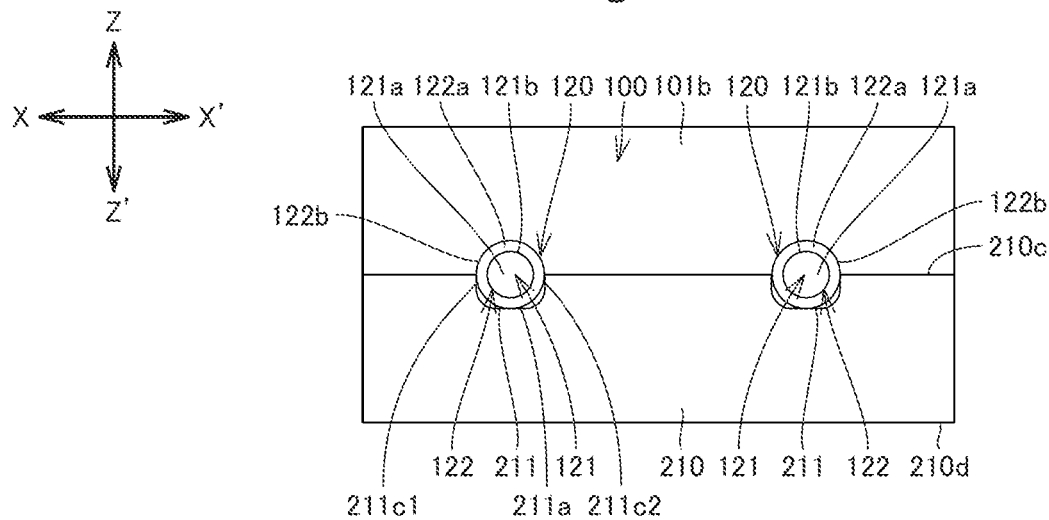
FIG. 5B is an enlarged rear view of a second variant of the lens of the assembly.
Figure 5C:
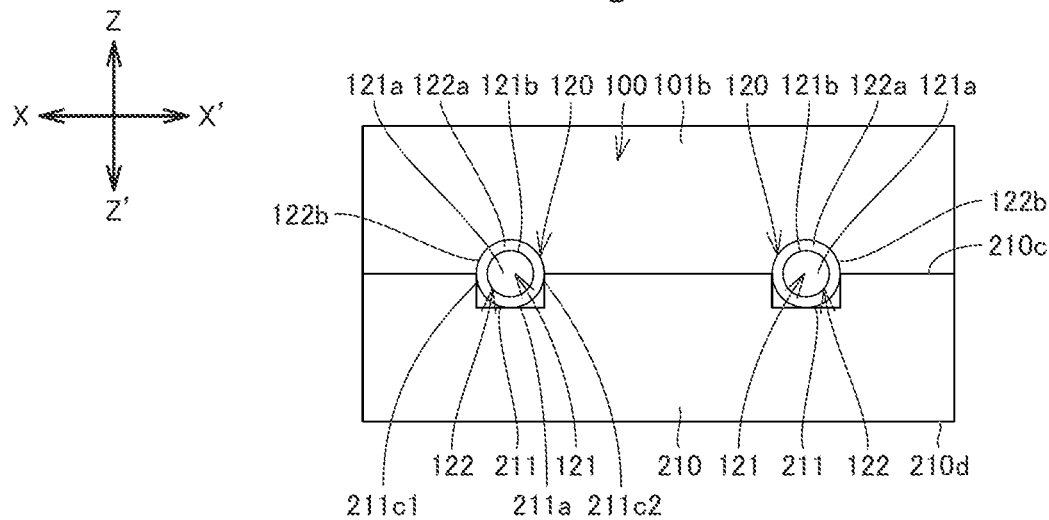
FIG. 5C is an enlarged rear view of a third variant of the lens of the assembly.
Figure 6A:
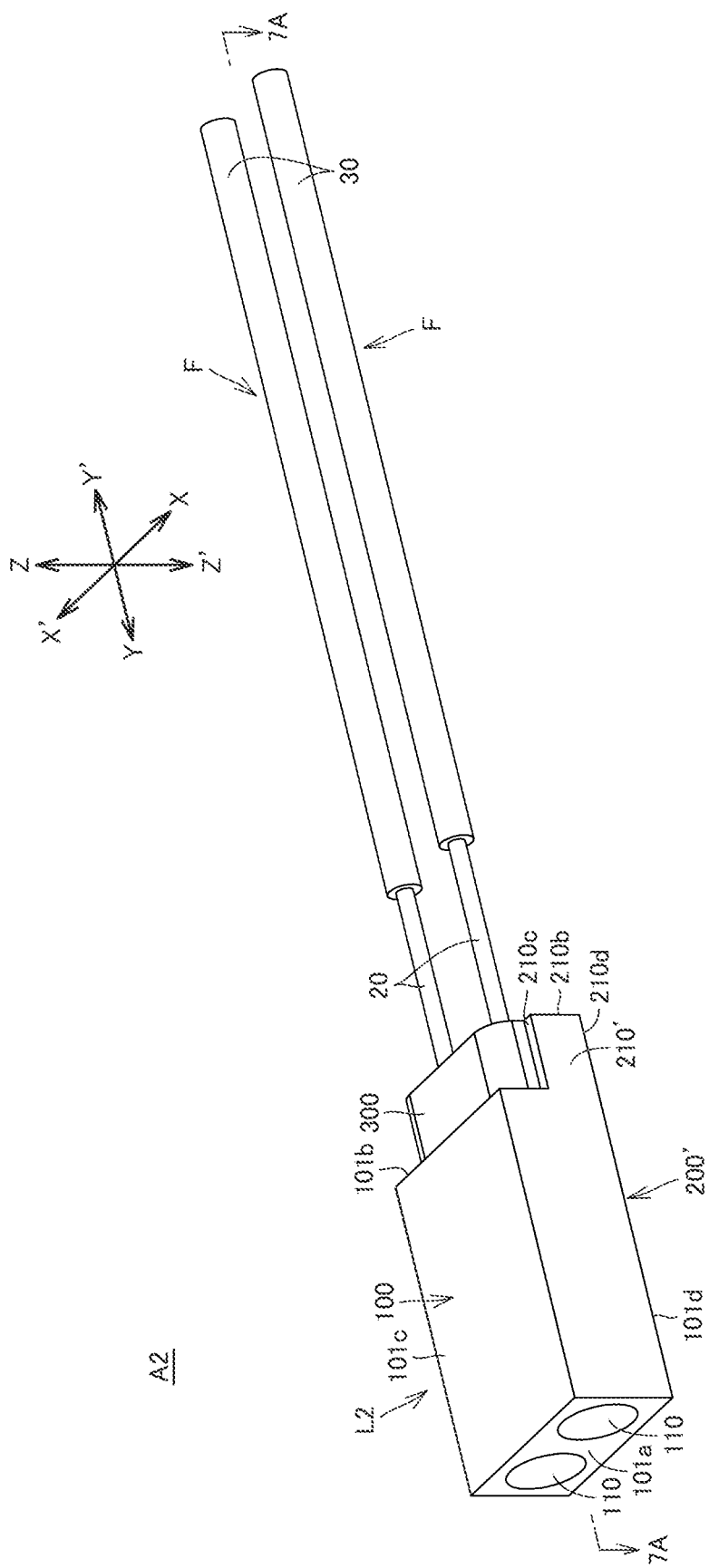
FIG. 6A is a front, top, right side perspective view of a lens and optical fiber assembly according to the second embodiment of the invention.
Figure 6B:
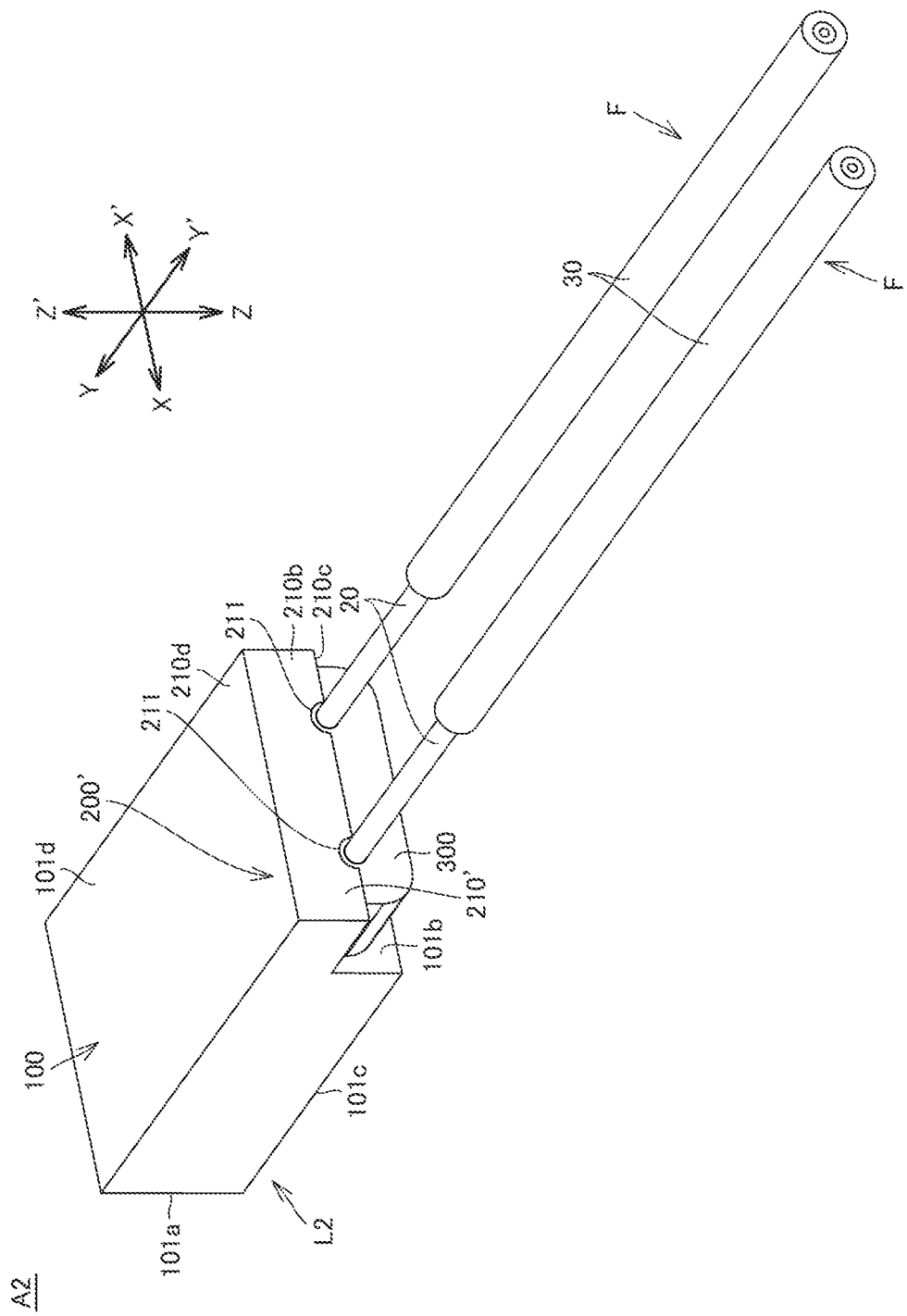
FIG. 6B is a rear, bottom, left side perspective view of the assembly.
Figure 7A:
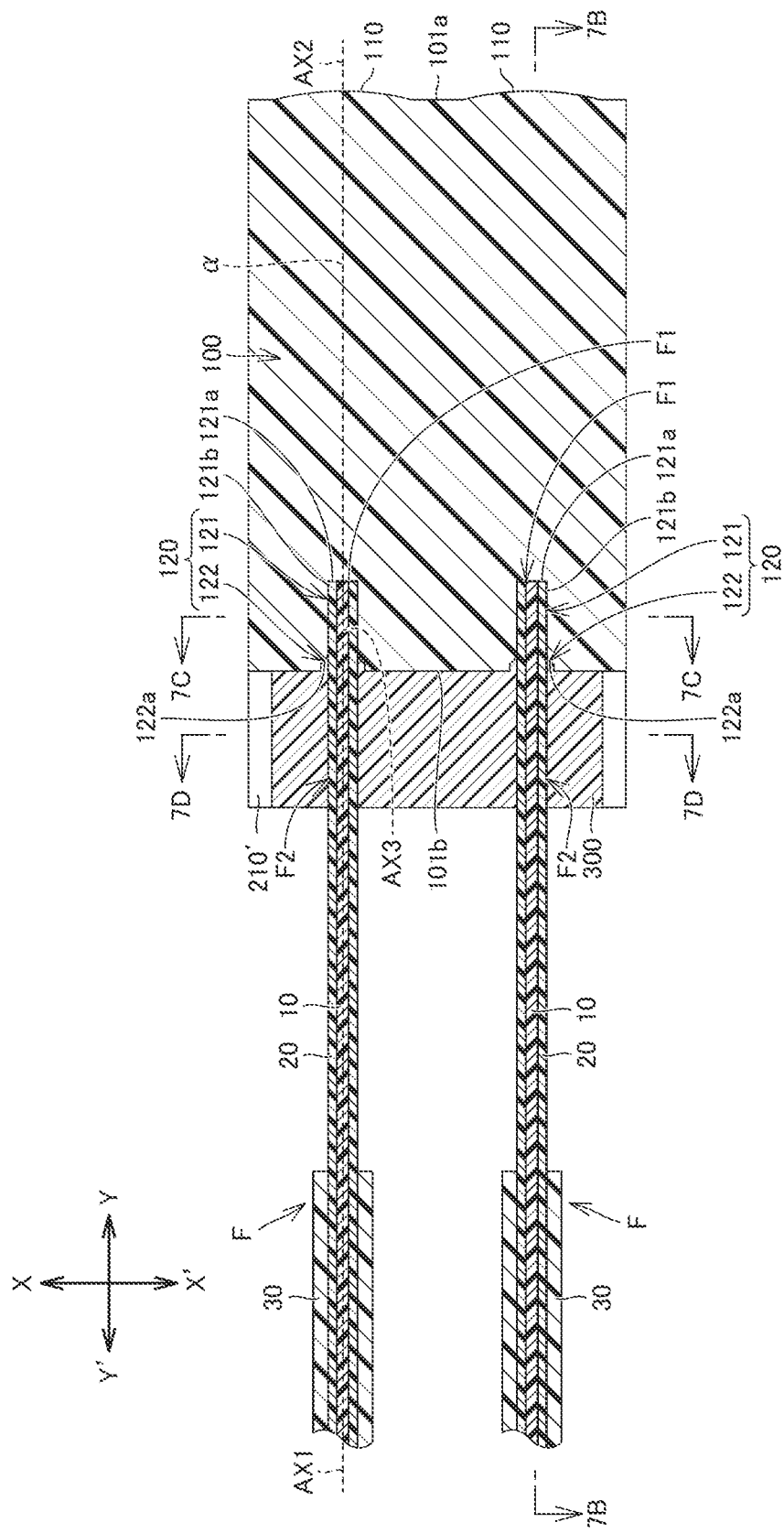
FIG. 7A is an enlarged partial sectional view of the assembly, taken along line 7A-7A in FIG. 6A.
Figure 7B:
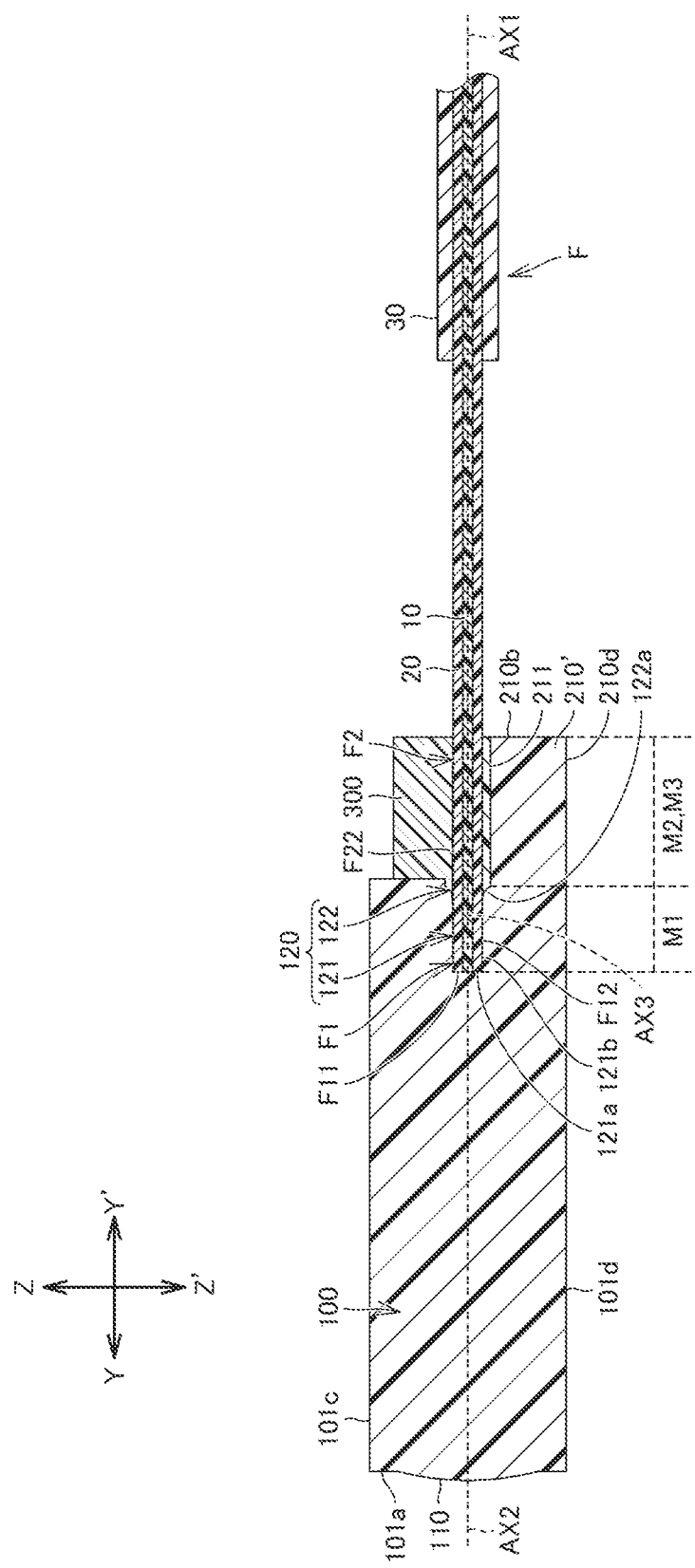
FIG. 7B is an enlarged partial sectional view of the assembly, taken along line 7B-7B in FIG. 7A.
Figure 7C:
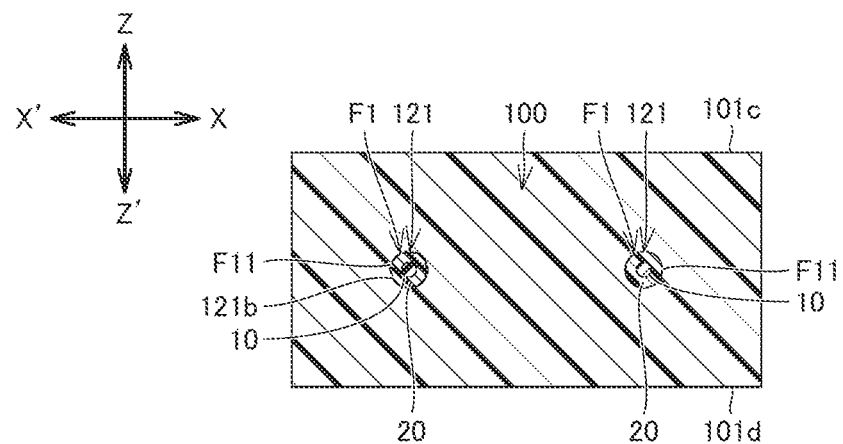
FIG. 7C is an enlarged partial sectional view of the assembly, taken along line 7C-7C in FIG. 7A.
Figure 7D:
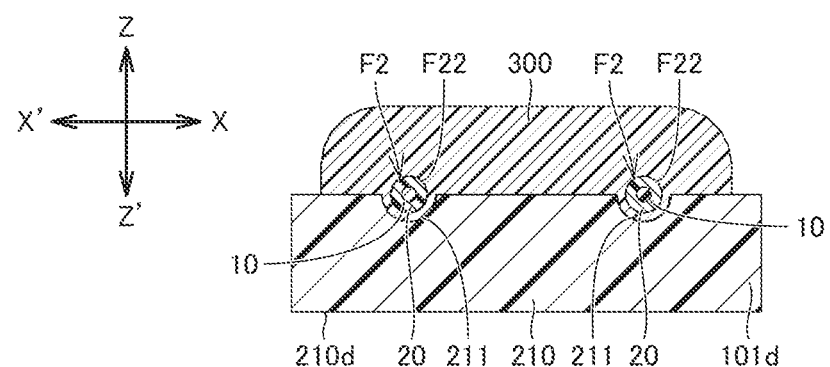
FIG. 7D is an enlarged partial sectional view of the assembly, taken along line 7D-7D in FIG. 7A.
Figure 8A:
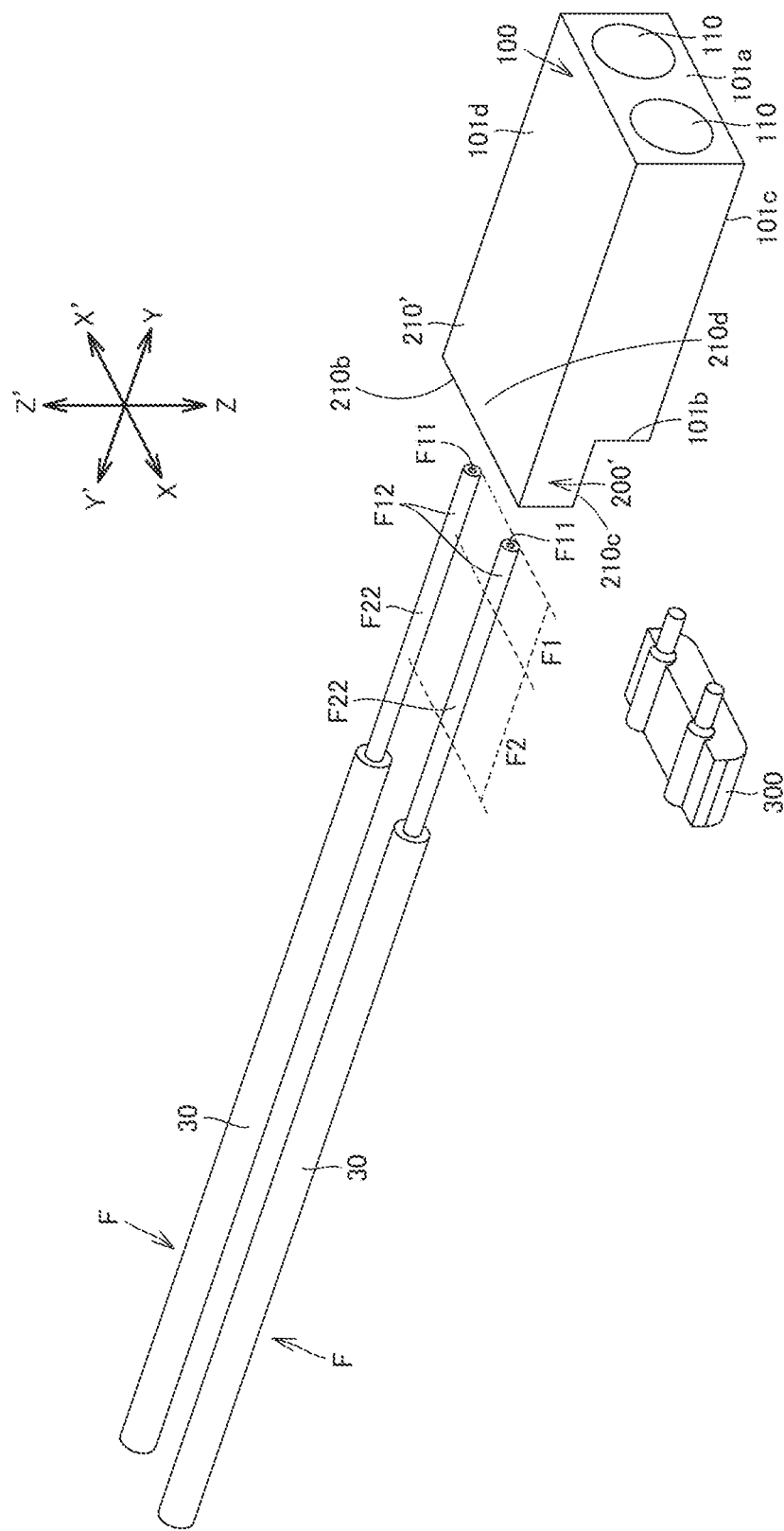
FIG. 8A is an exploded, front, top, left side perspective view of the assembly.
Figure 8B:
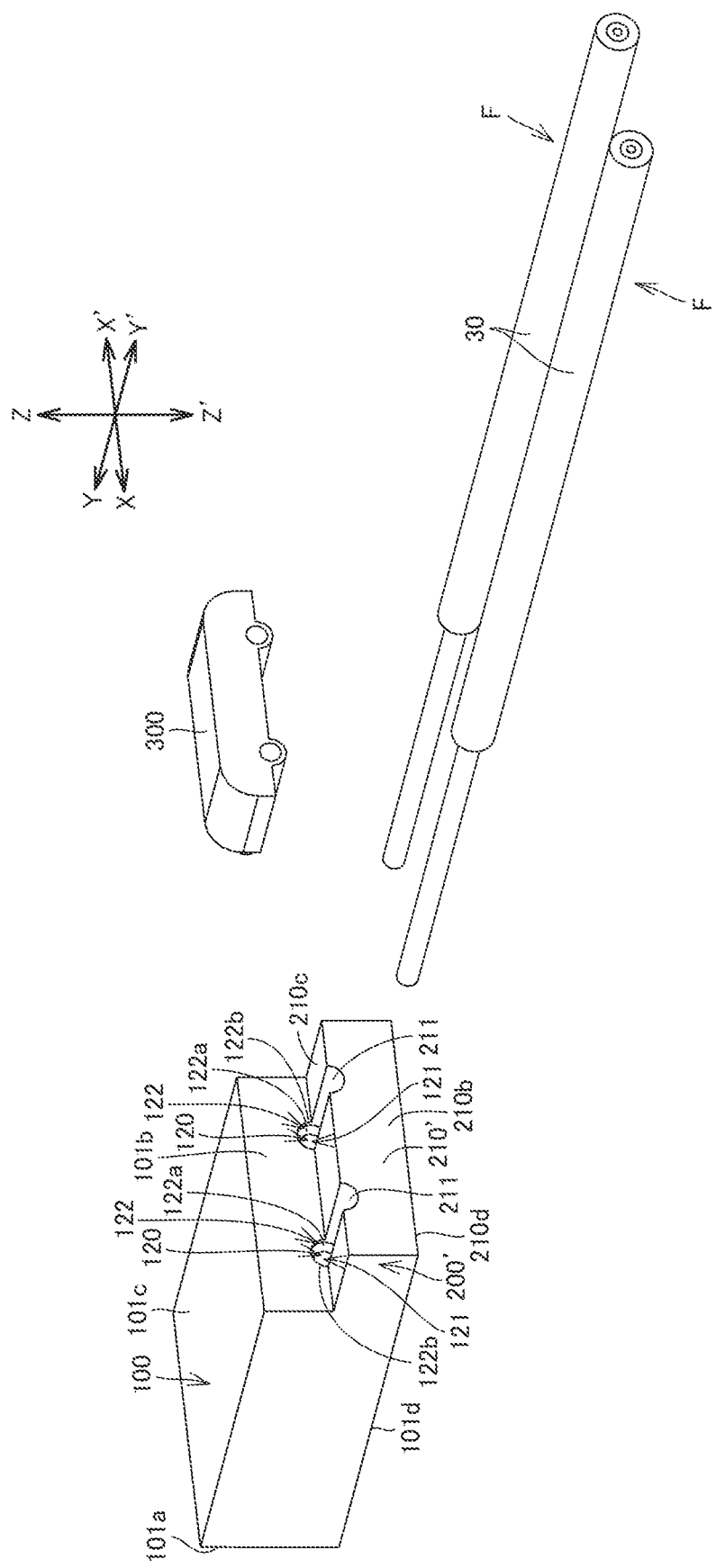
FIG. 8B is an exploded, rear, bottom, right side perspective view of the assembly.

Hereinafter described is a lens and optical fiber assembly A1 according to a plurality of embodiments, including the first embodiment and variants thereof, of the invention with reference to FIGS. 1A to 5C. FIGS. 1A to 4B illustrate the assembly A1 of the first embodiment. FIG. 5A illustrates a first variant of a lens L1 of the assembly A1 of the first embodiment, FIG. 5B illustrates a second variant of the lens L1 of the assembly A1 of the first embodiment, and FIG. 5C illustrates a third variant of the lens L1 of the assembly A1 of the first embodiment. FIGS. 1A to 2B, 3A, 4A, and 4B show a Y-Y' direction (first direction). The Y-Y' direction includes a Y direction (one side in the first direction) and a Y' direction (the other side in the first direction). FIGS. 1A, 1B, 2B, 3A to 4B, and 5A to 5C show a Z-Z' direction (second direction). The Z-Z' direction includes a Z' direction (one side in the second direction) and a Z direction (the other side in the second direction). FIGS. 1A to 2A, 3A to 4B, and 5A to 5C show an X-X' direction (third direction). The X-X' direction includes an X direction (one side in the third direction) and an X' direction (the other side in the third direction).

The assembly A1 includes a plurality of optical fibers F and the lens L1.

The plurality of optical fibers F are single-mode fibers or multimode optical fibers (e.g., step-index optical fibers or graded-index optical fibers).

Figure 2A:
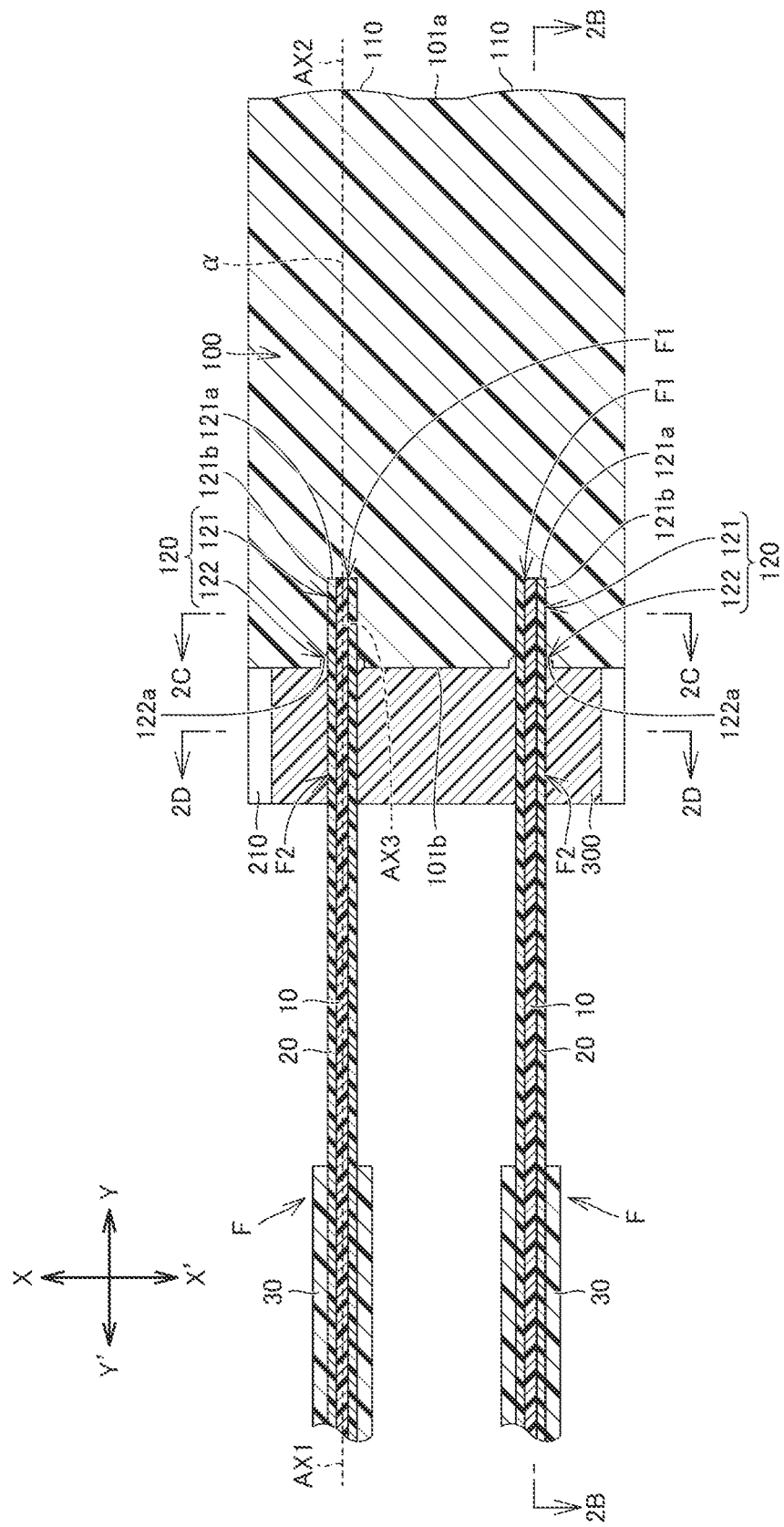
FIG. 2A is an enlarged partial sectional view of the assembly, taken along line 2A-2A in FIG. 1A.

Each of the optical fibers includes a core 10 of cylindrical shape and a cladding 20 of tubular shape with a circular section to cover the core 10. The core 10 is made of a glass, a silicone resin, an acrylic resin, or the like material that have an optical transparency to optical signals (e.g., is transparent or translucent). The cladding 20 is made of a glass, a silicone resin, or an acrylic resin that have an optical transparency to optical signals (e.g., is transparent or translucent). The cladding 20 is lower in refractive index than the core 10, e.g., by approximately 1%. The difference in refractive index between the core 10 and the cladding 20 causes optical signals to propagate inside the core 10. Examples of the glass described above include a quartz glass, a multicomponent glass, or the like. Examples of the acrylic resins include a polymethyl methacrylate resin (PMMA) or the like. Each of the optical fibers F has an optical axis AX1 (center axis), which is illustrated by broken lines in FIGS. 2A and 2B, but only one optical axis AX1 is illustrated in FIG. 2A for convenience of illustration.

Each of the optical fibers F may further include a sheath 30 of tubular shape with a circular section. The sheath 30 is made of a synthetic resin or the like material and covers the cladding 20.

Each of the optical fibers F includes a first portion F1 and a second portion F2. The first portion F1 is a distal portion on the Y-direction side of each optical fiber F. The first portion F1 includes an end face F11 on the Y-direction side and an outer peripheral face F12. The second portion F2 is a portion, on the Y'-direction side relative to the first portion F1, of each optical fiber F and is contiguous with the first portion F1 of each optical fiber F. The second portion F2 includes an outer peripheral face F22. The outer peripheral face F22 of the second portion F2 extends in the Y' direction from the outer peripheral face F12 of the first portion F1. The first portion F1 and the second portion F2 may not be covered by the sheath 30. In other words, the first portion F1 may be distal portions on the Y-direction side of the core 10 and the cladding 20, and the second portion F2 may be portions on the Y'-direction side relative to the distal portions, of the core 10 and the cladding 20 (see FIGS. 1A to 2D and FIGS. 4A to 4B). Alternatively, the first portion F1 may be distal portions on the Y-direction side of the core 10, the cladding 20, and the sheath 30, and the second portion F2 may be a portion on the Y'-direction side relative to the distal portions of the core 10, the cladding 20, and the sheath 30 (not illustrated). The sheaths 30 can be omitted.

The lens L1 includes a lens body 100. The lens body 100 is made of a synthetic resin, a glass, or the like that have such a translucency as to transmit optical signals propagated through the optical fibers F (e.g., is transparent or translucent). The lens body 100 may be formed by molding or machining the synthetic resin or a glass. The lens body 100 includes a first face 101a on the Y-direction side, a second face 101b on the Y'-direction side, a third face 101c on the Z-direction side, and a fourth face 101d on the Z'-direction side.

The lens body 100 includes a plurality of lens portions 110 and a plurality of holding holes 120. The number of the lens portions 110 may be equal to the number of the optical fibers F. The number of the holding holes 120 is equal to the number of the lens portions 110.

The lens portions 110 are provided in the lens body 100 to be positioned on the Y-direction side relative to the respective holding holes 120. For example, the lens portions 110 may be provided on the first face 101a of the lens body 100 (see FIGS. 1A to 4B). Alternatively, where the first face 101a of the lens body 100 is provided with one or more first recesses opening out in the Y direction, the lens portions 110 may be provided on the bottom face of the (single) first recess, or on the bottom face of the respective first recesses, of the lens body 100 (not illustrated). Alternatively, the lens portions 110 may be provided in the lens body 100 such that the end faces on the Y'-direction side of the lens portions 110 serve also as bottom faces 121a of the respective holding holes 120 (not illustrated). For convenience of description, one of the holding holes 120 on the Y'-direction side relative to each lens portion 110 may be hereinafter referred to as a "corresponding holding hole 120," and one of the optical fibers to be securely received in the corresponding holding hole 120 may be hereinafter referred to as a "corresponding optical fiber F."

Each of the lens portions 110 is a plano-convex lens having an aspherical shape projecting in the Y direction (see FIGS. 1A to 4B) or a spherical shape projecting in the Y direction. Each lens portion 110 is configured to converge optical signals incident on the lens portion 110 from the Y' direction at a predetermined focal distance and converge optical signals incident on the lens portion 110 from the Y direction at a predetermined focal distance. Each lens portion 110 has a first focal point on the Y-direction side relative to the lens portion 110 and a second focal point on the Y'-direction side relative to the lens portion 110. An optical axis AX2 of each lens portion 110 passes through a substantially central position and the first and second focal points of the lens portion 110 (see FIGS. 2A and 2B). Each lens portion 110 may, but is not required to, have such an aspherical or spherical face that the second focal point is positioned on the bottom face 121a of the corresponding holding hole 120, on the Y'-direction side relative to the lens portion 110.

Figure 2B:
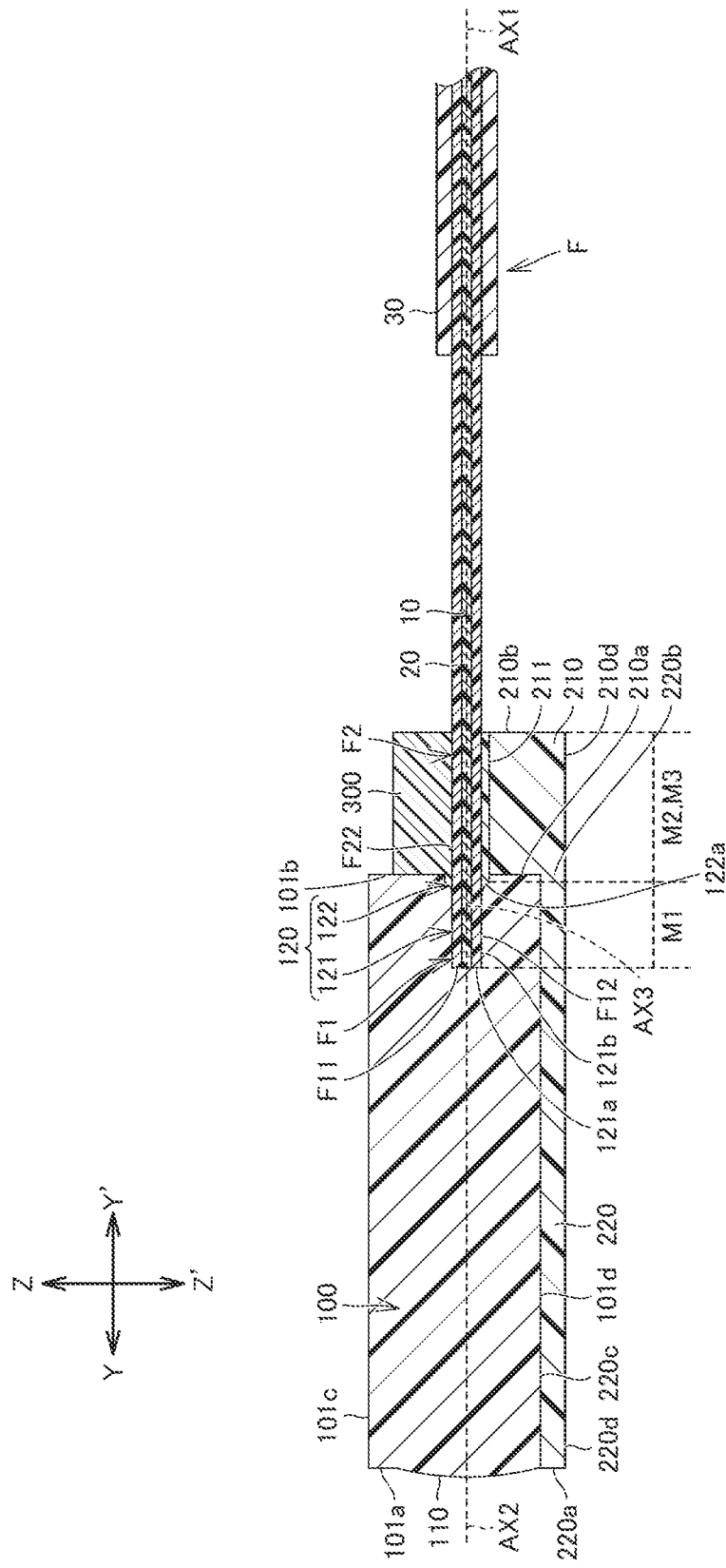
FIG. 2B is an enlarged partial sectional view of the assembly, taken along line 2B-2B in FIG. 2A.
Figure 2C:
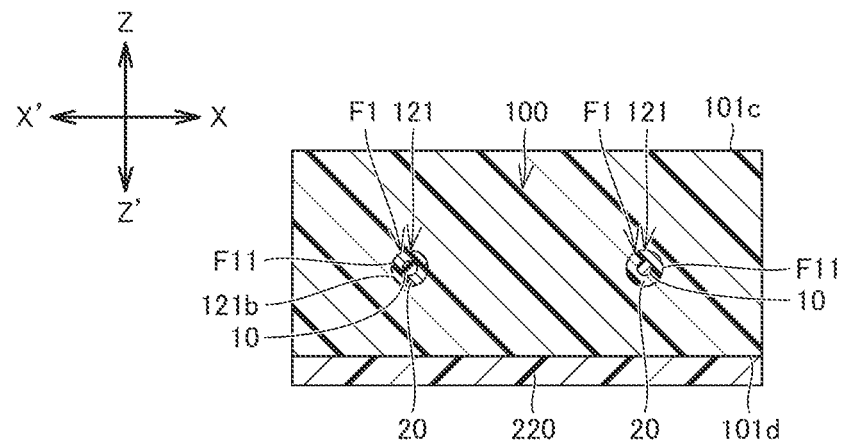
FIG. 2C is an enlarged partial sectional view of the assembly, taken along line 2C-2C in FIG. 2A.
Figure 2D:
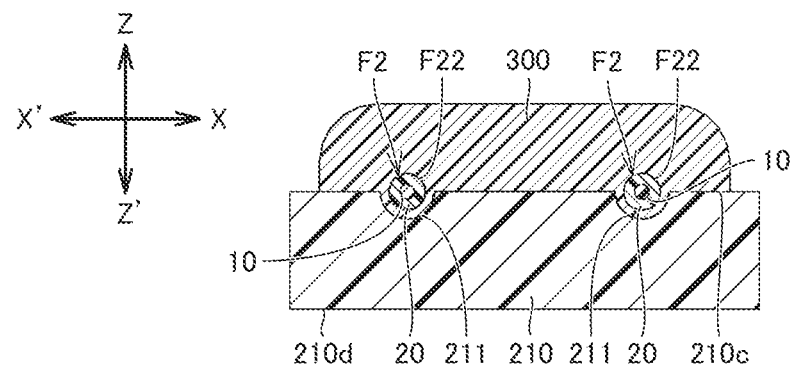
FIG. 2D is an enlarged partial sectional view of the assembly, taken along line 2D-2D in FIG. 2A.
Figure 3A:
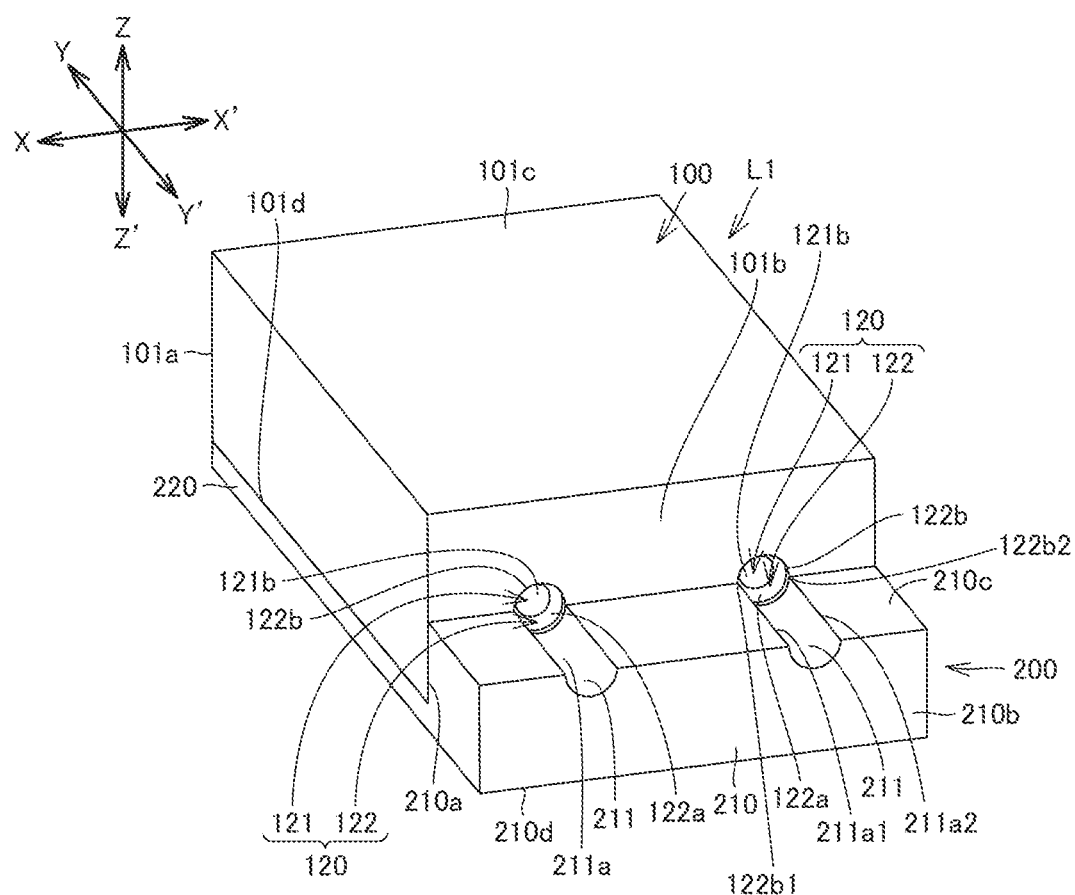
FIG. 3A is an enlarged, rear, top, right side perspective view of the lens of the assembly.
Figure 3B:
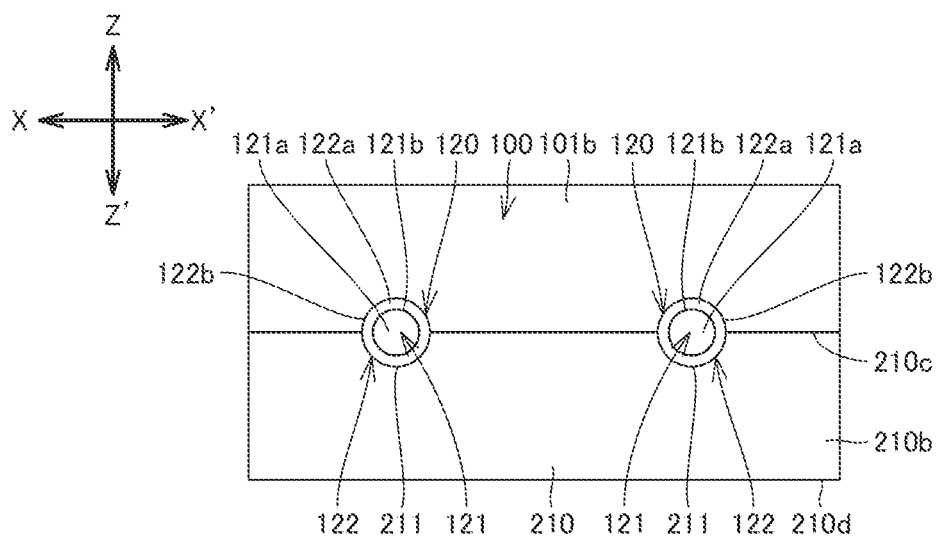
FIG. 3B is an enlarged rear view of the lens of the assembly.
Figure 4A:
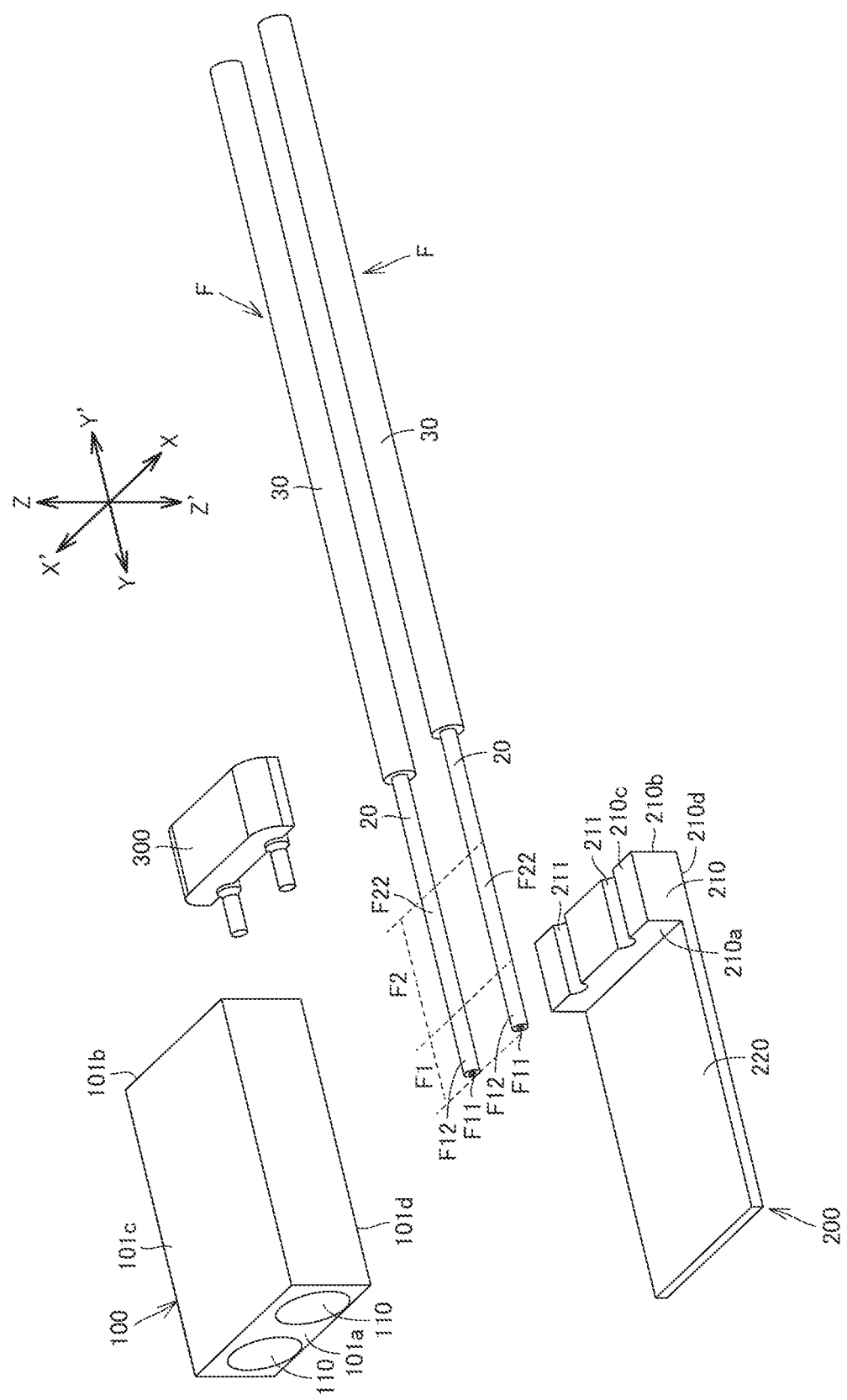
FIG. 4A is an exploded, front, top, right side perspective view of the assembly.
Figure 4B:
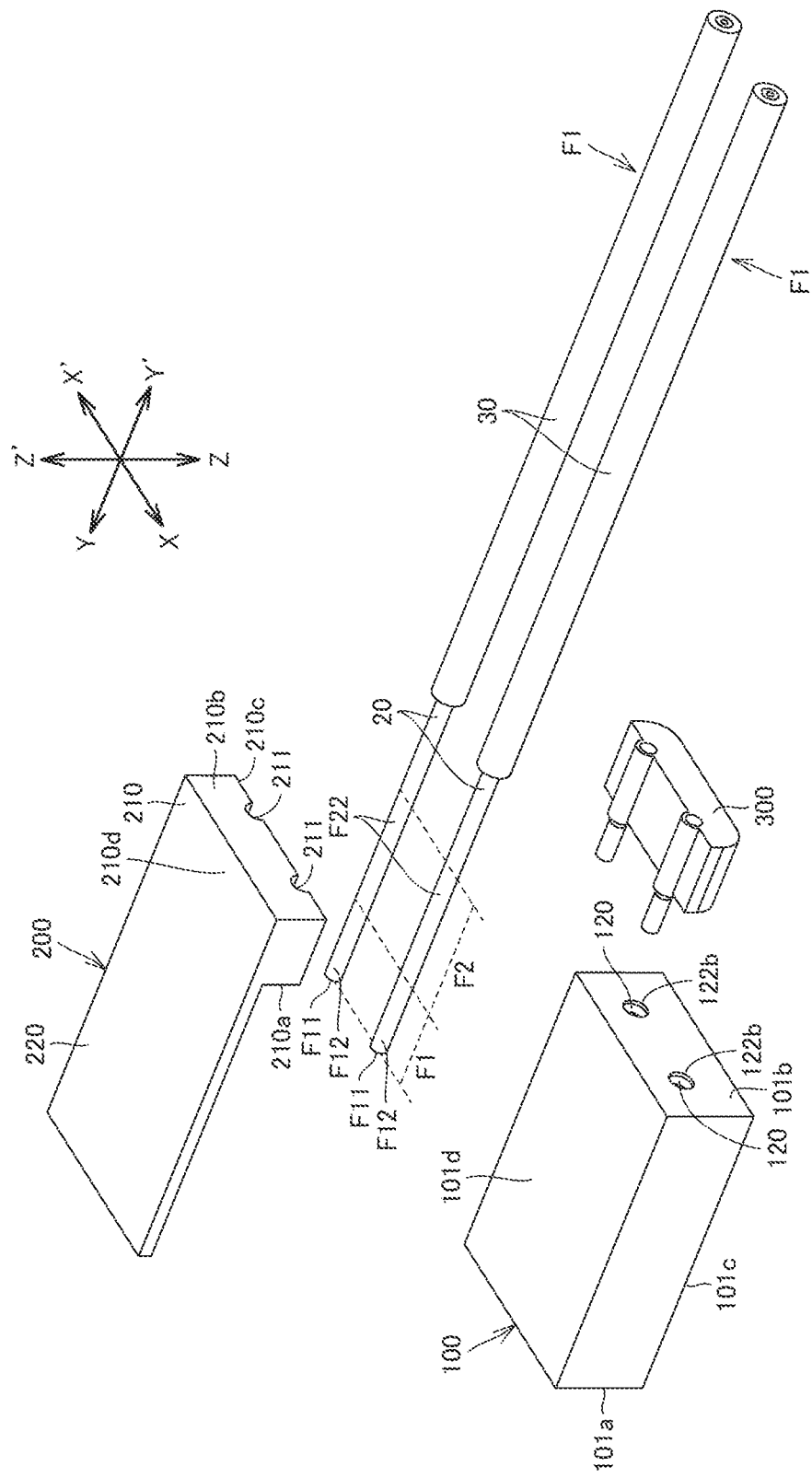
FIG. 4B is an exploded, rear, bottom, left side perspective view of the assembly.

In any case, for convenience of description, phantom lines a extend in the Y-Y' direction through the optical axis AX2 of the respective lens portions 110 (see FIGS. 2A and 2B). In FIGS. 2A and 2B, the optical axis AX2 of each lens portion 110 overlaps the phantom line a passing therethrough, so that these are indicated by the same broken line for convenience of illustration. In FIG. 2A, only one broken line is illustrated for convenience of illustration.

The holding holes 120 are positioned on the Y-direction side relative to the respective lens portions 110, and the central axes AX3 of the holding holes 120 are positioned on the respective phantom lines a (see FIGS. 2A and 2B).

The plurality of lens portions 110 are arranged at spaced intervals along the X-X' direction and are positioned on the Y-direction side relative to the respective holding holes 120. Where three or more lens portions 110 are provided, the three or more lens portions 110 include two or more pairs of adjacent lens portions 110. The space between adjacent lens portions 110 of one of the pairs may be equal to, or different from, the space of the other pairs.

The plurality of holding holes 120 are blind holes of cylindrical shape extending in the Y-Y' direction and opening out in the Y' direction, and are provided in the lens body 100. For example, the holding holes 120 may be provided in the second face 101b of the lens body 100 (see FIGS. 1A to 4B). Alternatively, where the second face 101b of the lens body 100 is provided with one or more second recesses opening out in the Y' direction, the holding holes 120 may be provided in the bottom face of the (single) second recess, or in the bottom faces of the respective second recesses, of the lens body 100 (not illustrated). Note that the Y-Y' direction corresponds to the axial direction of the central axis AX3 of each holding hole 120.

Each of the holding holes 120 includes the bottom face 121a on the Y-direction side and a peripheral face 121b of tubular shape with a circular section extending from the bottom face 121a in the Y' direction. Each of the bottom faces 121a of the holding holes 120 may be a flat face extending along the Z-Z' and X-X' directions (see FIGS. 1A to 4B), or may be a curved face (e.g., conical face) recessed in the Y or Y' direction (not illustrated). Each holding hole 120 includes a peripheral edge 122b of ring shape, which is the ring-shaped end on the Y'-direction side of the peripheral face 121b.

Each of the holding holes 120 has a cross-sectional diameter along the Z-Z' and X-X' directions that is substantially equal to the cross-sectional outer diameter along the Z-Z' and X-X' directions of the first portion F1 of the corresponding optical fiber F. More specifically, each holding hole 120 has a cross-sectional diameter along the Z-Z' and X-X' directions that is slightly larger (e.g., larger by 20-40 μm) than the cross-sectional outer diameter of the first portion F1 of the corresponding optical fiber F so as to receive the first portions F1 of the optical fibers F in the corresponding holding holes 120 from the Y' direction. In a state where the first portions F1 of the optical fibers F are securely received in the corresponding holding holes 120 (this state may be hereinafter referred to as a "securely received state"), the end faces F11 of the first portions F1 of the optical fibers F abut the corresponding bottom faces 121a of the holding holes 120. Also, since each holding hole 120 has a cross-sectional diameter along the Z-Z' and X-X' directions that is slightly larger (e.g., larger by 20-40 μm) than the cross-sectional outer diameter of the first portion F1 of the corresponding optical fiber F, there is a small gap between the peripheral face 121b of each holding hole 120 and the outer peripheral face F12 of the first portion F1 of the corresponding optical fiber F in the securely received state. However, because of the self weights of the optical fibers F, the outer peripheral faces F12 of the first portion F1 partly abut the peripheral faces 121b of the holding holes 120. In this securely received state, the optical axis AX1 of each optical fiber F is positioned on the corresponding phantom line a (see FIGS. 2A and 2B). In FIGS. 2A and 2B, the optical axis AX2 of each lens portion 110, the phantom line a passing therethrough, and the optical axis AX1 of the corresponding optical fiber F on the phantom line a overlap one another, these are indicated by the same broken line for convenience of illustration.

Each of the holding holes 120 may include a hole body 121 and a guide hole 122. The hole body 121 is a blind hole of cylindrical shape extending in the Y-Y' direction, and includes a bottom face 121a and a peripheral face 121b. The hole body 121 has a cross-sectional diameter along the Z-Z' and X-X' directions that corresponds to (is substantially equal to (see FIG. 2C)) the cross-sectional outer diameter along the Z-Z' and X-X' directions of the first portion F1 of the corresponding optical fiber F. The guide hole 122 is a hole of a truncated-cone shape extending in the Y' direction from the hole body 121 and opening out in the Y' direction, and includes a peripheral face 122a. The guide hole 122 has a cross-sectional diameter along the Z-Z' and X-X' directions that gradually decreases in moving in the Y direction. In other words, the peripheral face 122a of the guide hole 122 is a tapered face. In this case, the peripheral edge 122b of each holding hole 120 in the lens body 100 is not the ring-shaped end on the Y'-direction side of the peripheral face 121b, but a ring-shaped end on the Y'-direction side of the peripheral face 122a of the guide hole 122.

The first portions F1 of the optical fibers F are configured to be respectively inserted into the hole bodies 121 through the guide holes 122. During the insertion, the first portions F1 of the optical fibers F are guided into the respective hole bodies 121 by the respective peripheral faces 122a of the guide holes 122. With the first portions F1 of the optical fibers F securely received in the respective hole bodies 121, the bottom faces 121a of the hole main bodies 121 abut the respective end faces F11 of the first portions F1 of the optical fibers F, and the peripheral faces 121b of the hole main bodies 121 abut the respective outer peripheral faces F12 of the first portions F1 of the optical fibers F. Note that each of the holding holes 120 is not required to include the hole body 121 and the guide hole 122, but may be a blind hole including only the bottom face 121a and the peripheral face 121b of tubular shape with a circular section.

The lens L1 further includes a support 200. The support 200 includes a support body 210. The support body 210 is made of the same material as the lens body 100 or of a synthetic resin that is different from the lens body 100. The support body 210 may be a separate member from the lens body 100. In this case, the support body 210 includes a first face 210a on the Y-direction side, a second face 210b on the Y'-direction side, a third face 210c on the Z-direction side, and a fourth face 210d on the Z'-direction side, and the support 200 may further include a fixing portion 220.

The fixing portion 220 is a plate made of the same material as the support body 210. The fixing portion 220 extends in the Y direction from a portion on the Z'-direction side of the first face 210a of the support body 210. The fixing portion 220 and the lens body 100 may have the same or different dimensions in the Y-Y' and X-X' directions. The fixing portion 220 has a first face 220a on the Y-direction side, a second face 220b on the Y'-direction side, a third face 220c on the Z-direction side, and a fourth face 220d on the Z'-direction side. The third face 220c of the fixing portion 220 is fixed to the fourth face 101d of the lens body 100 by bonding, welding, or other means. A portion on the Y-direction side of the first face 210a of the support body 210 is fixed to the second face 101b of the lens body 100 by bonding, welding, or other means. With the support 200 thus fixed, the support body 210 is positioned on the Y'-direction side relative to the lens body 100.

The fourth face 220d of the fixing portion 220 may be positioned at the same height in the Z-Z' direction as the fourth face 210d of the support body 210 (see FIG. 2B), or on the Z- or Z'-direction side relative to, the fourth face 210d of the support body 210 (not illustrated). The fixing portion 220 can be omitted. Where the fixing portion 220 is omitted, the first face 210a of the support body 210 is fixed to the second face 101b of the lens body 100 by bonding, welding, or other means. Also, with the support 200 thus fixed, the support body 210 is positioned on the Y'-direction side relative to the lens body 100.

The support body 210 is positioned at least partly on the Z'-direction side relative to the plurality of holding holes 120 in the lens body 100. For example, the support body 210 may be provided (1) on the lens body 100 such that the third face 210c is positioned on the Z'-direction side relative to the third face 101c of the lens body 100 and on the Z-direction side relative to the Z'-direction ends of the peripheral edges 122*b* of the holding holes 120; or (2) on the lens body 100 such that the third face 210*c* is positioned at the same height in the Z-Z' direction as the Z'-direction ends of the peripheral edges 122*b* of the holding holes 120.

The support body 210 may be provided with a plurality of guides 211. The number of the guides 211 is equal to the number of the holding holes 120. The guides 211 are provided on the support body 210 and positioned on the Y'-direction side relative to the respective holding holes 120. For convenience of description, one of the holding holes 120 on the Y'-direction side relative to each guide 211 may be hereinafter referred to as a "corresponding holding hole 120," and one of the optical fibers to be securely received in the corresponding holding hole 120 may be hereinafter referred to as a "corresponding optical fiber F."

(3) Where the support body 210 has configuration (1) above, each guide 211 is a long groove in the third face 210*c* of the support body 210, extends in the Y' direction from the corresponding holding hole 120, and opens out in the Z and Y' directions. Each guide 211 has a cross section, taken along the Z-Z' and X-X' directions, of circular arc shape (see FIGS. 2D and 3A to 4B), V shape (see FIG. 5A), or generally U shape (U shape with round corners (see FIG. 5B), or generally square U shape (generally U shape with angular corners (see FIG. 5C)). Each guide 211 has a dimension M2 in the Y-Y' direction. The support body 210 has a dimension M3 in the Y-Y' direction (linear distance in the Y-Y' direction from the first face 210*a* to the second face 210*b*). The dimensions M2 and M3 may each be larger than, equal to, or smaller than, the dimension M1 in the Y-Y' direction of the corresponding holding hole 120.

(3-1) Where each guide 211 is a groove having a cross-section of circular arc shape, each guide 211 includes a bottom face 211*a* of the groove, and the bottom face 211*a* curves along a portion on the Z'-direction side of the peripheral edge 122*b* of the corresponding holding hole 120 as viewed from the Y' direction. In other words, the circular-arc-shaped curve appearing in the cross-section of each guide 211 extends along the portion on the Z'-direction side of the peripheral edge 122*b* of the corresponding holding hole 120 (see FIGS. 2C, 2D, and 3A-3B). The curve appearing in the cross-section of each guide 211 has an arc length of ½ or less (in FIGS. 2D, 3, 4A, and 4B, the curve appearing in the cross-section of each guide 211 is of circular arc shape having an arc length of ½ of the total arc length of the peripheral edge 122*b* (is of semicircular arc shape)). Each guide 211 further includes a first edge 211*a*1, on the X and Z-direction side, of the bottom face 211*a*, and a second edge 211*a*2, on the X' and Z-direction side, of the bottom face 211*a*.

Each guide 211 may have a dimension in the X-X' direction that is substantially equal to the dimension in the X-X' direction (diameter) of the peripheral edge 122*b* of the corresponding holding hole 120. In this case, the peripheral edge 122*b* of the corresponding holding hole 120 may be a ring-shaped end on the Y'-direction side of the peripheral face 121*b* of the corresponding holding hole 120, or may be a ring-shaped end on the Y'-direction side of the peripheral face 122*a* of the guide hole 122 of the corresponding holding hole 120. When viewed from the Y'-direction side (see FIGS. 3A and 3B), the bottom face 211*a* of each guide 211 curves so as to overlap the portion on the Z'-direction side of the peripheral edge 122*b* of the corresponding holding hole 120, the first edge 211*a*1 of each guide 211 is positioned on a first point 122*b*1 on the X-direction side of the peripheral edge 122*b* of the corresponding holding hole 120, and the second edge 211*a*2 of each guide 211 is positioned on a second point 122*b*2 on the X'-direction side of the peripheral edge 122*b* of the corresponding holding hole 120.

Alternatively, each guide 211 may have a dimension in the X-X' direction that is smaller than the dimension in the X-X' direction (diameter) of the peripheral edge 122*b* of the corresponding holding hole 120. In this case, the peripheral edge 122*b* of the corresponding holding hole 120 is a ring-shaped end on the Y'-direction side of the peripheral face 122*a* of the guide hole 122 of the corresponding holding hole 120. When viewed from the Y'-direction side, the bottom face 211*a* of each guide 211 is positioned between the peripheral edge 122*b* of the corresponding holding hole 120 and the peripheral face 121*b* of the corresponding holding hole 120, the first edge 211*a*1 of each guide 211 is positioned on the X'-direction side relative to the peripheral edge 122*b* of the corresponding holding hole 120 and on the X-direction side relative to the peripheral face 121*b* of the corresponding holding hole 120, and the second edge 211*a*2 of each guide 211 is positioned on the X-direction side relative to the peripheral edge 122*b* of the corresponding holding hole 120 and on the X'-direction side relative to the peripheral face 121*b* of the corresponding holding hole 120.

In any aspect, when the first portion F1 of the corresponding optical fiber F is inserted into each guide 211, the first portion F1 of the corresponding optical fiber F is brought into abutment with the bottom face 211*a* of each guide 211 from the Z'-, X-, and the X'-direction sides and guided along the Y-Y' direction by each guide 211 into the corresponding holding hole 120. Also, with the first portion F1 of the corresponding optical fiber F securely received in the corresponding holding hole 120, the second portion F2 of the corresponding optical fiber F is inserted into each guide 211. As a result, the bottom face 211*a* of each guide 211 abut and supports the second portion F2 of the corresponding optical fiber F from the Z'-direction side. Also, the bottom face 211*a* of each guide 211 is placed with clearances on the X- and X'-direction sides to the second portion F2 of the corresponding optical fiber F so as to restrict the position of the second portion F2 of the corresponding optical fiber F from the X- and X'-direction sides.

(3-2) Where each guide 211 is a groove having a cross-section of V shape (see FIG. 5A), each guide 211 includes a first bottom face 211*b*1 and a second bottom face 211*b*2 of the groove. The first bottom face 211*b*1 and the second bottom face 211*b*2 are inclined such that a distance in the X-X' direction between the first bottom face 211*b*1 and the second bottom face 211*b*2 gradually increases from Z'-direction ends to Z-direction ends of the first and second bottom faces 211*b*1, 211*b*2. Each of the first and second bottom faces 211*b*1, 211*b*2 of each guide 211 includes the Z'-direction-side end, the Z-direction-side end, and an intermediate point between the Z'-direction-side end and the Z-direction-side end. The Z'-direction-side ends of the first and second bottom faces 211*b*1, 211*b*2 of each guide 211 meet each other, and are positioned on the Z'-direction side relative to, or at the same height position in the Z-Z' direction as, the end on the Z'-direction side of the peripheral edge 122*b* of the corresponding holding hole 120 (see FIG. 5A). Each guide 211 has a dimension in the Z-Z' direction (depth dimension of the groove) that is less than ½ of the dimension in the Z-Z' direction (diameter) of the peripheral edge 122*b* of the corresponding holding hole 120.

When viewed from the Y'-direction side, the first bottom face 211*b*1 of each guide 211 may extend in a first oblique direction, which includes components of the X and Z directions, such that the Z-direction-side end of the first bottom face 211*b*1 is positioned on the X-direction side relative to the peripheral edge 122b of the corresponding holding hole 120, and the intermediate point of the first bottom face 211b1 is positioned on the first point 122b1 on the X-direction side of the peripheral edge 122b of the corresponding holding hole 120; and the second bottom face 211b2 of each guide 211 may extend in a second oblique direction, which includes components of the X' and Z directions, such that the Z-direction-side end of the second bottom face 211b2 is positioned on the X'-direction side relative to the peripheral edge 122b of the corresponding holding hole 120, and the intermediate point of the second bottom face 211b2 is positioned on the second point 122b2 on the X'-direction side of the peripheral edge 122b of the corresponding holding hole 120. Alternatively, the first bottom face 211b1 of each guide 211 may extend in the first oblique direction such that the Z-direction-side end of the first bottom face 211b1 is positioned on the first point 122b1 of the peripheral edge 122b of the corresponding holding hole 120, and the second bottom face 211b2 of each guide 211 may extend in the second oblique direction such that the Z-direction-side end of the second bottom face 211b2 is positioned on the second point 122b2 of the peripheral edge 122b of the corresponding holding hole 120. In either case, the peripheral edge 122b of the corresponding holding hole 120 may be a ring-shaped end on the Y'-direction side of the peripheral face 121b of the corresponding holding hole 120, or may be a ring-shaped end on the Y'-direction side of the peripheral face 122a of the guide hole 122 of the corresponding holding hole 120.

Still alternatively, the first bottom face 211b1 of each guide 211 may extend in the first oblique direction such that the Z-direction-side end of the first bottom face 211b1 is positioned on X'-direction side relative to the peripheral edge 122b of the corresponding holding hole 120 and on the X-direction side relative to the peripheral face 121b of the corresponding holding hole 120, and the second bottom face 211b2 of each guide 211 may extend in the second oblique direction such that the Z-direction-side end of the second bottom face 211b2 is positioned on the X-direction side relative to the peripheral edge 122b of the corresponding holding hole 120 and on the X'-direction side relative to the peripheral face 121b of the corresponding holding hole 120. In this case, the peripheral edge 122b of the corresponding holding hole 120 is a ring-shaped end on the Y'-direction side of the peripheral face 122a of the guide hole 122 of the corresponding holding hole 120.

In any aspect, when the first portion F1 of the corresponding optical fiber F is inserted into each guide 211, the first portion F1 of the corresponding optical fiber F is brought into abutment with the first bottom face 211b1 of each guide 211 from the Z'- and X-direction sides, brought into abutment with the second bottom face 211b2 of each guide 211 from the Z'- and X'-direction sides, and guided along the Y-Y' direction by each guide 211 into the corresponding holding hole 120. Also, with the first portion F1 of the corresponding optical fiber F securely received in the corresponding holding hole 120, the second portion F2 of the corresponding optical fiber F is inserted into each guide 211. As a result, the first bottom face 211b1 of each guide 211 abuts the second portion F2 of the corresponding optical fiber F from the Z'- and X-direction sides, and the second bottom face 211b2 of each guide 211 abuts the second portion F2 of the corresponding optical fiber F from the Z'- and X'-direction sides, so that each guide 211 supports the second portion F2 of the corresponding optical fiber F and restricts the position of the second portion F2 of the corresponding optical fiber F from the X- and X'-direction sides.

(3-3) Where each guide 211 is a groove having a cross-section of generally U shape (see FIGS. 5B and 5C), each guide 211 includes a first side face 211c1 on the X-direction side of the groove, a second side face 211c2 on the X-direction side of the groove, and a bottom face 211a of the groove. The first side face 211c1 and the second side face 211c2 of each guide 211 has a dimension in the Z-Z' direction (the groove has a depth dimension) that is equal to, or less than, the dimension in the Z-Z' direction (diameter) of the peripheral edge 122b of the corresponding holding hole 120 (in FIGS. 5B and 5C, the dimension in the Z-Z' direction of the first side face 211c1 and the second side face 211c2 of each guide 211 (the depth dimension of a groove)) is ½ of the dimension in the Z-Z' direction (diameter) of the peripheral edge 122b of the corresponding holding hole 120).

The dimension in the X-X' direction of each guide 211 may be substantially equal to the dimension in the X-X' direction (diameter) of the peripheral edge 122b of the corresponding holding hole 120, and the bottom face 211a of each guide 211 may be positioned at the same height in the Z-Z' direction as the Z'-direction end of the peripheral edge 122b of the corresponding holding hole 120. In this case, the peripheral edge 122b of the corresponding holding hole 120 may be a ring-shaped end on the Y'-direction side of the peripheral face 121b of the corresponding holding hole 120, or may be a ring-shaped end on the Y'-direction side of the peripheral face 122a of the guide hole 122 of the corresponding holding hole 120. When viewed from the Y'-direction side, the first side face 211c1 of each guide 211 extends in the Z direction such that a part thereof (e.g., a Z-direction-side end of the first side face 211c1, or an intermediate part between the Z-direction-side end and a Z'-direction-side end of the first side face 211c1) is positioned on an X-direction-side end of the peripheral edge 122b of the corresponding holding hole 120. Also, when viewed from the Y'-direction side, the second side face 211c2 of each guide 211 extends in the Z direction such that a part thereof (e.g., a Z-direction-side end of the second side face 211c2, or an intermediate part between the Z-direction-side end and a Z'-direction-side end of the second side face 211c2) is positioned on an X'-direction-side end of the peripheral edge 122b of the corresponding holding hole 120.

Alternatively, each guide 211 may have a dimension in the X-X' direction that is smaller than the dimension in the X-X' direction (diameter) of the peripheral edge 122b of the corresponding holding hole 120, and the bottom face 211a of each guide 211 may be positioned on the Z-direction side relative to the Z'-direction end of the peripheral edge 122b of the corresponding holding hole 120. In this case, the peripheral edge 122b of the corresponding holding hole 120 is a ring-shaped end on the Y'-direction side of the peripheral face 122a of the guide hole 122 of the corresponding holding hole 120. When viewed from the Y'-direction side, the first side face 211c1 of each guide 211 extends in the Z direction such that a part thereof (e.g., the Z-direction-side end of the first side face 211c1, or the intermediate part between the Z-direction-side end and the Z'-direction-side end of the first side face 211c1) is positioned on the X'-direction side relative to the peripheral edge 122b of the corresponding holding hole 120 and on the X-direction side relative to the peripheral face 121b of the corresponding holding hole 120. Also, when viewed from the Y'-direction side, the second side face 211c2 of each guide 211 extends in the Z direction such that a part thereof (e.g., the Z-direction-side end of the second side face 211c2, or the intermediate part between the Z-direction-side end and the Z'-direction-side end of the second side face 211c2) is positioned on the X-direction side relative to the peripheral edge 122b of the corresponding holding hole 120 and on the X'-direction side relative to the peripheral face 121b of the corresponding holding hole 120. Also, when viewed from the Y'-direction side, the bottom face 211a of each guide 211 is positioned on the Z-direction side relative to a Z'-direction-side end of the peripheral edge 122b of the corresponding holding hole 120 and is positioned on the Z'-direction side relative to a Z'-direction-side end of the peripheral face 121b of the corresponding holding hole 120.

In any aspect, when the first portion F1 of the corresponding optical fiber F is inserted into each guide 211, the first portion F1 of the corresponding optical fiber F is brought into abutment with the bottom face 211a of each guide 211 from the Z'-direction side, into abutment with the first side face 211c1 of each guide 211 from the X-direction side, and into abutment with the second side face 211c2 of each guide 211 from the X'-direction side, and guided along the Y-Y' direction by each guide 211 into the corresponding holding hole 120. Also, with the first portion F1 of the corresponding optical fiber F securely received in the corresponding holding hole 120, the second portion F2 of the corresponding optical fiber F is inserted into teach guide 211. As a result, the bottom face 211a of each guide 211 abuts and supports the second portion F2 of the corresponding optical fiber F from the Z'-direction side. Also, the first side face 211c1 of each guide 211 is placed with a clearance on the X-direction side to the second portion F2 of the corresponding optical fiber F, and the second side face 211c2 of each guide 211 is placed with a clearance on the X'-direction side to the second portion F2 of the corresponding optical fiber F. These arrangements restrict the position of the second portion F2 of the corresponding optical fiber F from the X- and X'-direction sides.

(4) Where the support body 210 has configuration (2) above, each guide 211 is provided on the third face 210c of the support body 210 and includes a pair of ridges (a ridge on the X-direction side and a ridge on the X'-direction side) extending in the Y-Y' direction and a bottom face between the ridges (not illustrated). The pair of ridges of each guide 211 is in contact with the second face 101b of the lens body 100. The pair of ridges of each guide 211 has a dimension in the Z-Z' direction that is equal to, or less than, the dimension in the Z-Z' direction (diameter) of the peripheral edge 122b of the corresponding holding hole 120. The dimension M2 in the Y-Y' direction of each guide 211 (dimension in the Y-Y' direction of the pair of ridges) may be larger than, equal to, or smaller than, the dimension M1 in the Y-Y' direction of the corresponding holding hole 120.

A distance in the X-X' direction between the ridges of each guide 211 may be substantially equal to the dimension in the X-X' direction (diameter) of the peripheral edge 122b of the corresponding holding hole 120, and the bottom face of each guide 211 may be positioned at the same height in the Z-Z' direction as the Z'-direction end of the peripheral edge 122b of the corresponding holding hole 120. In this case, the peripheral edge 122b of the corresponding holding hole 120 may be the ring-shaped end on the Y'-direction side of the peripheral face 121b of the corresponding holding hole 120, or may be a ring-shaped end on the Y'-direction side of the peripheral face 122a of the guide hole 122 of the corresponding holding hole 120. The ridge on the X-direction side of each guide 211 extends in the Z direction such that an inner wall surface thereof on the X'-direction side is positioned at the same position in the X-X' direction as an X-direction-side end of the peripheral edge 122b of the corresponding holding hole 120 when viewed from the Y'-direction side. The ridge on the X'-direction side of each guide 211 extends in the Z direction such that an inner wall surface thereof on the X-direction side is positioned at the same position in the X-X' direction as an X'-direction-side end of the peripheral edge 122b of the corresponding holding hole 120 when viewed from the Y'-direction side. The bottom face of each guide 211 is positioned at the same position in the Z-Z' direction as the Z'-direction side end of the peripheral edge 122b of the corresponding holding hole 120 when viewed from the Y'-direction side.

Alternatively, the distance in the X-X' direction between the ridges of each guide 211 may be smaller than the dimension in the X-X' direction (diameter) of the peripheral edge 122b of the corresponding holding hole 120, and the bottom face of each guide 211 may be positioned on the Z-direction side relative to the Z'-direction end of the peripheral edge 122b of the corresponding holding hole 120. In this case, the peripheral edge 122b of the corresponding holding hole 120 is the ring-shaped end on the Y'-direction side of the peripheral face 122a of the guide hole 122 of the corresponding holding hole 120. The ridge on the X-direction side of each guide 211 extends in the Z direction such that a part of an inner wall surface thereof on the X'-direction side (e.g., a Z-direction-side end of the inner wall surface, or an intermediate part between the Z-direction-side end and a Z'-direction-side end of the inner wall surface) is positioned on the X'-direction side relative to the peripheral edge 122b of the corresponding holding hole 120 and is positioned on the X-direction side relative to the peripheral face 121b of the corresponding holding hole 120 when viewed from the Y'-direction side. The ridge on the X'-direction side of each guide 211 extends in the Z direction such that a part of an inner wall surface thereof on the X-direction side (e.g., a Z-direction-side end of the inner wall surface, or an intermediate part between the Z-direction-side end and a Z'-direction-side end of the inner wall surface) is positioned on the X-direction side relative to the peripheral edge 122b of the corresponding holding hole 120 and is positioned on the X'-direction side relative to the peripheral face 121b of the corresponding holding hole 120 when viewed from the Y'-direction side. The bottom face of each guide 211 is positioned on the Z-direction side relative to the Z'-direction-side end of the peripheral edge 122b of the corresponding holding hole 120 and on the Z'-direction side relative to the Z'-direction-side end of the peripheral face 121b of the corresponding holding hole 120 when viewed from the Y'-direction side.

In any aspect, when the first portion F1 of the corresponding optical fiber F is inserted between the pair of ridges of each guide 211, the first portion F1 of the corresponding optical fiber F is brought into abutment with the bottom face of each guide 211 from the Z'-direction side, into abutment with the ridge on the X-direction side of each guide 211 from the X-direction side, and into abutment with the ridge on the X'-direction side of each guide 211 from the X'-direction side, and guided along the Y-Y' direction by and between the ridges of each guide 211 into the corresponding holding hole 120. Also, with the first portion F1 of the corresponding optical fiber F securely received in the corresponding holding hole 120, the second portion F2 of the corresponding optical fiber F is inserted into each guide 211. As a result, the bottom face of each guide 211 abuts the second portion F2 of the corresponding optical fiber F from the Z'-direction side, and the ridge on the X-direction side of each guide 211 is placed with a clearance on the X-direction side relative to the second portion F2 of the corresponding optical fiber F, and the ridge on the X'-direction side of each guide 211 is placed with a clearance on the X'-direction side relative to the second portion F2 of the corresponding optical fiber F. These arrangements restrict the position of the second portion F2 of the corresponding optical fiber F from the X- and X'-direction sides.

The plurality of guides 211 may be omitted (not illustrated). In this case, the support body 210 has configuration (2) above. With the first portion F1 of the corresponding optical fiber F securely received in the corresponding holding hole 120, the third face 210c of the support body 210 supports the second portion F2 of the corresponding optical fiber F from the Z'-direction side. The dimension M3 in the Y-Y' direction of the support body 210 may be larger than, equal to, or smaller than, the dimension M1 of the corresponding holding hole 120 in the Y-Y' direction.

The assembly A1 is only required to include at least one of the optical fibers F of any of the aspects described above. Where a single optical fiber F is provided, the lens body 100 of the lens L1 of the assembly A1 is only required to include a single holding hole 120 of any of the above aspects, which securely receives the first portion F1 of the one optical fiber F, and a single lens portion 110 of any of the above aspects, which is positioned on the Y-direction side relative to the single holding hole 120. The lens body 100 of the lens L1 of the assembly A1 may further include a single guide 211 of any of the above aspects, which is positioned on the Y'-direction side relative to the single holding hole 120. The single guide 211 may be omitted.

The assembly A1 may further include a bonding member 300. The bonding member 300 is obtained by curing a thermosetting adhesive, a photocurable adhesive, or other adhesive curable at room temperature. With the first portion or portions F1 of the one or more optical fibers F securely received in the holding hole or holes 120 (this state may also be hereinafter referred to as a "securely received state"), the bonding member 300 bonds the second portion or portions F2 of the one or more optical fibers F to the support body 210.

In the securely received state, the bonding member 300 is provided on the second portion or portions F2 of the one or more optical fibers F and on the third face 210c of the support body 210. In this case, the bonding member 300 bonds the second portion or portions F2 of the one or more optical fibers F to the third face 210c of the support body 210.

Where the one or more guides 211 are provided, the bonding member 300 may also be provided on the one or more guides 211 in the securely received state. For example, where the one or more guides 211 are the groove or grooves of configuration (3-1) above, a part of the bonding member 300 exists between the bottom face or faces 211a of the one or more guides 211 and the second portion or portions F2 of the one or more optical fibers F. Where the one or more guides 211 are the groove or grooves of configuration (3-2) above, a part of the bonding member 300 exists between the first bottom face or faces 211b1 and the second portion or portions F2 of the one or more optical fibers F and between the second bottom face or faces 211b2 of the one or more guides 211 and the second portion or portions F2 of the one or more optical fibers F. Where the one or more guides 211 are the groove or grooves of configuration (3-3) above, a part of the bonding member 300 exists between the bottom face or faces 211a of the one or more guides 211 and the second portion or portions F2 of the one or more optical fibers F, between the first side face or faces 211c1 of the one or more guides 211 and the second portion or portions F2 of the one or more optical fibers F, and between the second side face or faces 211c2 of the one or more guides 211 and the second portion or portions F2 of the one or more optical fibers F. Where the one or more guides 211 include the pair or pairs of ridges of configuration (4) above, a part of the bonding member 300 exists between the bottom face or faces between the ridges of the one or more guides 211 and the second portion or portions F2 of the one or more optical fibers F, and between the inner wall surfaces of the ridges of the one or more guides 211 and the second portion or portions F2 of the one or more optical fibers F. In any case, the bonding member 300 bonds the second portion or portions F2 of the one or more optical fibers F not only to the third face 210c of the support body 210, but also to the one or more guides 211.

In the securely received state, the bonding member 300 may be provided on the second face 101b of the lens body 100, in addition to on the second portion or portions F2 of the one or more optical fibers F and the third face 210c of the support body 210, or the second portion or portions F2 of the one or more optical fibers F, the one or more guides 211, and the third face 210c of the support body 210. In this case, the bonding member 300 also adheres to the second face 101b of the lens body 100. Furthermore, the bonding member 300 may include another part enter between, and thereby bonds together, the outer peripheral face or faces F12 of the first portion or portions F1 of the one or more optical fibers F and the peripheral face or faces 121b of the holding hole or holes 120.

The bonding member 300 may, but is not required to, have a dimension in the Y-Y' direction that is equal to, or smaller than, the dimension M3 in the Y-Y' direction of the support body 210. The bonding member 300 may, but is not required to, have a dimension in the X-X' direction that is equal to, or smaller than, the dimension in the X-X' direction of the support body 210. The bonding member 300 may, but is not required to, include an end face on the Z-direction side that is positioned at the same height position in the Z-Z' direction as, or on the Z'-direction side relative to, the third face 101c of the lens body 100.

The bonding member 300 may be colored in a color that is different from a color of at least one of the lens body 100 or the support 200, or in a color that is the same as the color of the lens body 100 and the support 200.

Methods for manufacturing the assembly A1 will now be described in detail.

First, the support 200 is prepared as a separate body from the lens body 100. The lens body 100 is provided with the one or more lens portions 110 and the one or more holding holes 120, and the support body 210 of the support 200 is provided with the one or more guides 211. While positioning the one or more guides 211 so that the one or more guides 211 are positioned on the Y'-direction side relative to the one or more holding holes 120, the third face 220c of the fixing portion 220 of the support 200 is fixed to the fourth face 101d of the lens body 100 by bonding, welding, or other means, and simultaneously the portion on the Z-direction side of the first face 210a of the support body 210 of the support 200 is fixed to the second face 101b of the lens body 100 by bonding, welding, or other means. The support body 210 is thus placed on the Y'-direction side relative to the lens body 100. The lens body 100 and the support 200 thus fixed together are fixed to a dedicated conveying jig.

It is possible not to fix the support 200 to the lens body 100. Instead, an adhesive may be applied to the third face 220c of the fixing portion 220 of the support 200 and the portion on the Z-direction side of the first face 210a of the support body 210 of the support 200, While positioning the one or more guides 211 so that the one or more guides 211 are positioned on the Y'-direction side relative to the one or more holding holes 120, the third face 220c of the fixing portion 220 of the support 200 may be brought into contact with the fourth face 101d of the lens body 100 via the adhesive, and simultaneously the portion on the Z-direction side of the first face 210a of the support body 210 of the support 200 may be brought into contact with the second face 101b of the lens body 100 via the adhesive. The lens body 100 and the support 200 in the unfixed state as described above may be fixed to the dedicated conveying jig.

The one or more optical fibers F are prepared. The first portion or portions F1 of the one or more optical fibers F are inserted into the one or more guides 211 from the Y'-direction side and moved in the Y-Y' direction. The first portion or portions F1 of the one or more optical fibers F are thus guided by the one or more guides 211 into, and inserted into, the one or more holding holes 120. During this insertion, an abutting tool (not illustrated) may be pressed against the one or more optical fibers F from the Z-direction side. That is to say, during the insertion, the one or more optical fibers F are securely sandwiched in the Z-Z' direction between the one or more guides 211 and the abutting tool. When the first portion or portions F1 of the one or more optical fibers F are inserted into the one or more holding holes 120, the end face or faces F11 of the first portions or portions F1 of the one or more optical fibers F are brought into abutment with the bottom face or faces 121a of the one or more holding holes 120, and the outer peripheral face or faces F12 of the first portion or portions F1 of the one or more optical fibers F are brought into abutment partly with the peripheral face or faces 121b of the one or more holding holes 120, whereby the first portion or portions F1 of the one or more optical fibers F are held in the one or more holding holes 120. At the same time, the second portion or portions F2 of the one or more optical fibers F are inserted into the one or more guides 211 and supported in any one of the manners described above. In this state, the one or more optical fibers F are fixed to the conveying jig so as to extend along the optical axis AX2. Where the one or more holding holes 120 have the guide hole or holes 122, the fixation of the one or more optical fibers F to the conveying jig creates an interstice or interstices between the second portion or portions F2 of the one or more optical fibers F and the one or more guides 211. However, where the one or more holding holes 120 have no guide holes 122, the fixation of the one or more optical fibers F to the conveying jig maintains the state where the second portion or portions F2 of the one or more optical fibers F abut the bottom faces of the one or more guides 211.

Where the one or more guides 211 are omitted, the above manufacturing method may be modified as follows. The step of guiding the first portion or portions F1 of the one or more optical fibers F by the one or more guides 211 is omitted. Also, when the end face or faces F11 of the first portions or portions F1 of the one or more optical fibers F abuts the bottom face or faces 121a of the one or more holding holes 120 and the outer peripheral face or faces F12 of the first portion or portions F1 of the one or more optical fibers F abut the peripheral face or faces 121b of the one or more holding holes 120, the second portion or portions F2 of the one or more optical fibers F are not inserted into the one or more guides 211 but supported by the third face 210c of the support body 210. Where the abutting tool (not illustrated) is pressed against the one or more optical fibers F from the Z-direction side during the insertion, the one or more optical fibers F are securely sandwiched in the Z-Z' direction between the support body 210 and the abutting tool. Where the one or more holding holes 120 have the guide hole or holes 122, the fixation of the one or more optical fibers F to the conveying jig creates an interstice or interstices between the second portion or portions F2 of the one or more optical fibers F and the third face 210c of the support body 210. However, where the one or more holding holes 120 have no guide holes 122, the fixation of the one or more optical fibers F to the conveying jig maintains the state where the second portion or portions F2 of the one or more optical fibers F abut the third face 210c of the support body 210.

It is also possible to perform an inspection for eliminating any defects in the lens L by transmitting optical signals through the one or more lens portions 110 of the lens L1 with the one or more optical fibers F fixed to the conveying jig.

Thereafter, any of the adhesives described above is prepared. The adhesive is then applied into a space defined by the second face 101b of the lens body 100 and the third face 210c of the support body 210. In other words, the adhesive is applied onto the second face 101b of the lens body 100, the third face 210c of the support body 210, the second portion or portions F2 of the one or more optical fibers F, and the one or more guides 211. At this time, where the one or more holding holes 120 have the guide hole or holes 122, a part of the adhesive enters between the one or more guides 211 and the second portion or portions F2 of the one or more optical fibers F, and another part of the adhesive enters from the guide hole or holes 122 of the one or more holding holes 120 and, by capillary action, further enters the interstice or interstices between the outer peripheral face or faces F12 of the first portion or portions F1 of the one or more optical fibers F and the hole main body or bodies 121 of the one or more holding holes 120 in the second face 101b of the lens body 100. Where the one or more holding holes 120 have no guide holes 122, a part of the adhesive enters between the one or more guides 211 and the second portion or portions F2 of the one or more optical fibers F, and another part of the adhesive enters, by capillary action, the interstice or interstices between the outer peripheral face or faces F12 of the first portion or portions F1 of the one or more optical fibers F and the one or more holding holes 120 in the second face 101b of the lens body 100.

Where the adhesive is a thermosetting type, the lens body 100, the support 200, the one or more optical fibers F, the adhesive, and the conveying jig are moved into a heating device, inside which the lens body 100, the support 200, the one or more optical fibers F, the adhesive, and the conveying jig are heated at a predetermined temperature so as to thermally cure the adhesive. The adhesive thus becomes the bonding member 300 and is fixed to the second face 101b of the lens body 100, the third face 210c of the support body 210, the one or more guides 211, and the second portion or portions F2 of the one or more optical fibers F, and bonds the second portion F2 of the one or more optical fibers F to the second face 101b of the lens body 100, the third face 210c of the support body 210, and the one or more guides 211. At the same time, the part of the bonding member 300 that has entered as described above bonds the outer peripheral face or faces F12 of the first portion or portions F1 of the one or more optical fibers F and the peripheral face or faces 121b of the one or more holding holes 120 together. Where the adhesive is a photocurable type, the lens body 100, the support 200, the one or more optical fibers F, the adhesive, and the conveying jig are moved into a photoirradiation device, instead of a heating device, inside which the adhesive is irradiated with light, such as UV light, so as to be cured to form the bonding member 300. The other adhesives may be cured by a known method to form the bonding member 300.

Where the lens body 100 and the support 200 in the unfixed state are fixed to the dedicated conveying jig, the adhesive for bonding the third face 220c of the fixing portion 220 of the support 200 to the fourth face 101d of the lens body 100, and the adhesive for bonding the portion on the Z-direction side of the first face 210a of the support body 210 of the support 200 to the second face 101b of the lens body 100, may be cured together with the adhesive to become the bonding member 300 in any of the manners described above.

Where the one or more guides 211 are omitted, the above manufacturing methods may be modified as follows. The application of the adhesive may be modified such that the adhesive is applied onto the second face 101b of the lens body 100, the third face 210c of the support body 210, and the second portion or portions F2 of the one or more optical fibers F. Where the bonding member 300 is not fixed to the second face 101b of the lens body 100, the adhesive may be applied without adhering to the second face 101b of the lens body 100. In this case, the above another part of the adhesive does not enter the interstice between the outer peripheral face or faces F12 of the first portion or portions F1 of the one or more optical fibers F and the one or more holding holes 120 in the second face 101b of the lens body 100.

It is possible, but not required, to place the lens body 100, the support 200, the one or more optical fibers F, the adhesive, and the conveying jig may be placed in a vacuum device to perform defoaming processing on the adhesive in order to remove air bubbles from the adhesive before the adhesive is cured.

The assembly A1 and the lens L1 described above provide the following technical features and effects.

First Technical Features and Effects: It is possible to improve the workability of attaching the one or more optical fibers F to the lens L1 for the following reasons. First, the central axis of the holding hole 120 of the lens L1 is positioned on the phantom line a extending in the Y-Y' direction through the optical axis AX2 of the lens portion 110 of the lens L1, or alternatively the central axes of the holding holes 120 of the lens L1 are positioned on the phantom lines a extending in the Y-Y' direction through the optical axes AX2 of the respective lens portions 110 of the lens L1. Where the one or more guides 211 are provided, with the first portion or portions F1 of the one or more optical fibers F are securely received in the one or more holding holes 120 of the lens L1, the end face or faces F11 of the first portions or portions F1 of the one or more optical fibers F abut the bottom face or faces 121a of the one or more holding holes 120, and the outer peripheral face or faces F12 of the first portion or portions F1 of the one or more optical fibers F abut the peripheral face or faces 121b of the one or more holding holes 120, and the second portion or portions F2 of the one or more optical fibers F are supported by the guided or guides 211 as described in (3-1), (3-2), (3-3), or (4) above and restricted in position from the X- and X'-direction sides by the guided or guides 211 as described in (3-1), (3-2), (3-3), or (4) above. Where the one or more guides 211 are not provided, with the first portion or portions F1 of the one or more optical fibers F securely received in the one or more holding holes 120 of the lens L1, the end face or faces F11 of the first portions or portions F1 of the one or more optical fibers F abut the bottom face or faces 121a of the one or more holding holes 120, and the outer peripheral face or faces F12 of the first portion or portions F1 of the one or more optical fibers F abut the peripheral face or faces 121b of the one or more holding holes 120 and supported by the third face 210c of the support body 210 from the Z'-direction side. In any case, the possibility is reduced that, before the curing of the adhesive, the one or more optical fibers F fall out of the one or more holding holes 120 under their own weights, the optical axis or axes AX1 of the one or more optical fibers F become inclined, or the optical axis or axes AX1 of the one or more optical fibers F become displaced from the central axis or axes of the one or more holding holes 120. This reduced possibility leads to ease of matching the optical axis or axes AX1 of the one or more optical fibers F with the optical axis or axes AX2 of the one or more lens portions 110 of the lens L1. Second, with the first portion or portions F1 of the one or more optical fibers F securely received in the one or more holding holes 120 of the lens L1, it is possible to bring the end face or faces F11 of the first portions or portions F1 of the one or more optical fibers F into abutment with the bottom face or faces 121a of the one or more holding holes 120 and thereby place the end face or faces F11 in position. Therefore, even if the lens L1 is subjected vibration or the like before the adhesive is cured, the one or more optical fibers F would not move in the Y direction. These advantages result in improved workability of attaching the one or more optical fibers F to the lens L1.

Second Technical Features and Effects: It is possible to reduce deterioration of reliability of optical communication characteristics using the assembly A1 and the lens L1 for the following reasons. As described for the first technical features and effects, the optical axis or axes AX1 of the one or more optical fibers F can be easily matched with the optical axis or axes AX2 of the one or more lens portions 110 of the lens L1; and the possibility is reduced that, before the curing of the adhesive, the one or more optical fibers F fall out of the one or more holding holes 120 under their own weights, the optical axis or axes AX1 of the one or more optical fibers F become inclined, or the optical axis or axes AX1 of the one or more optical fibers F become displaced from the central axis or axes of the one or more holding holes 120. In addition, where the second focal point or points of the one or more lens portions 110 are positioned on the bottom face or faces 121a of the one or more holding holes 120, as described for the first technical features and effects, with the first portion or portions F1 of the one or more optical fibers F securely received in the one or more holding holes 120 of the lens L1, the one or more optical fibers F would not move in the Y direction. Therefore, it is possible to reduce the possibility that the one or more optical fibers F move in the Y direction, and the end face or faces F11 of the one or more optical fibers F become displaced from the second focal point or points of the one or more lens portions 110 on the bottom face or faces 121a of the one or more holding holes 120 resulting in the loss of light quantity during the optical communication using the assembly A1 and the lens L1.

Third Technical Features and Effects: Where the one or more guides 211 are provided, and the dimension or dimensions M2 in the Y-Y' direction of the one or more guides 211 are larger than the dimension or dimensions M1 in the Y-Y' direction of the one or more holding holes 120, and the dimension M3 in the Y-Y' direction of the support body 210 is larger than the or each dimension M1 in the Y-Y' direction of the one or more holding holes 120, with the first portion or portions F1 of the one or more optical fibers F securely received in the one or more holding holes 120 of the lens L, the second portion or portions F2 of the one or more optical fibers F are more stably supported by the one or more guides 211 from the Z'-, X-, and X'-direction sides. Where the one or more guides 211 are not provided, and the dimension M3 in the Y-Y' direction of the support body 210 is larger than the or each dimension M1 in the Y-Y' direction of the one or more holding holes 120, the second portion or portions F2 of the one or more optical fibers F are more stably supported by the support body 210 from the Z'-direction side. In either case, because of the stable support of the second portion or portions F2 of the one or more optical fibers F, the possibility is further reduced that the one or more optical fibers F fall out of the one or more holding holes 120 under their own weights, the optical axis or axes AX1 of the one or more optical fibers F become inclined, or the optical axis or axes AX1 of the one or more optical fibers F become displaced from the central axis or axes of the one or more holding holes 120. As a result, the optical axis or axes AX1 of the one or more optical fibers F can be more easily matched with the optical axis or axes AX2 of the one or more lens portions 110 of the lens L1. Moreover, by setting the dimension M3 in the Y-Y' direction of the support body 210 to be larger than the or each dimension M1 in the Y-Y' direction of the one or more holding holes 120, it is possible to increase the area of the third face 210c of the support body 210 (i.e., the area of adhesion allowance) and thereby improve the adhesive strength with respect to the bonding member 300.

Fourth Technical Features and Effects: Where the bonding member 300 adheres not only to the second portion or portions F2 of the one or more optical fibers F and the third face 210c of the support body 210, but also to the second face 101b of the lens body 100, the adhesive strength of the bonding member 300 is improved.

Fifth Technical Features and Effects: Where the bonding member 300 is colored in a color that is different from a color of at least one of the lens body 100 and the support 200, it is possible to reduce the possibility, when mounting the assembly A1 into a housing of an electronic device, that the assembly A1 is inadvertently mounted into the housing in inverted orientation in the Z-Z' direction. Where the assembly A1 includes the plurality of lens portions 110, it is also possible to prevent misconnection due to the inadvertent mounting of the assembly A1 into the housing in inverted orientation in the Z-Z' direction.

Sixth Technical Features and Effects: Where the first portion or portions F1 and the second portion or portions F2 of the one or more optical fibers F are not covered with the sheath or sheaths 30, the outer diameter of the first portion F1 of the single optical fiber F has a dimensional accuracy that is higher than the dimensional accuracy of the outer diameter of the first portion F1 where the first portion F1 and the second portion F2 are covered with the sheath 30, or alternatively the outer diameter of each first portion F1 of the optical fibers F has a dimensional accuracy that is higher than the dimensional accuracy of the outer diameter of the each first portion F1 where the first portions F1 and the second portions F2 are covered with the sheaths 30. Therefore, by securely receiving the first portion or portions F1 of the one or more optical fibers F that are not covered by the sheath or sheaths 30 in the one or more holding holes 120, it is possible to improve the accuracy in matching the optical axis or axes AX1 of the one or more optical fibers F with the optical axis or axes AX2 of the one or more lens portions 110 of the lens L1.

Seventh Technical Features and Effects: Where the dimension in the Y-Y' direction of the bonding member 300 is equal to, or smaller than, the dimension M3 in the Y-Y' direction of the support body 210, the dimension in the X-X' direction of the bonding member 300 is equal to, or smaller than, the dimension in the X-X' direction of the support body 210, and the end face on the Z-direction side of the bonding member 300 is positioned at the same height position in the Z-Z' direction as, or on the Z'-direction side relative to, the third face 101c of the lens body 100, the bonding member 300 is placed so as to fit into a space defined by the second face 101b of the lens body 100 and the third face 210c of the support body 210. Therefore, when the assembly A1 is mounted into a housing of an electronic device, the outer face of the lens body 100 and/or the outer face of the support body 210 can be used as position reference planes for mounting.

Eighth Technical Features and Effects: Where the support 200 is formed separately from the lens body 100, multiple types of supports 200 having different outer shapes may be prepared in advance, and one of the types of supports 200 is fixed to the lens body 100 in a manner described above. This makes it possible to change the outer shape of the lens L1 without performing position alignment between the optical axis or axes AX2 of the one or more lens portions 110 of the lens body 100 and the central axis or axes of the one or more holding holes 120.

Second Embodiment

Hereinafter described is a lens and optical fiber assembly A2 according to a plurality of embodiments, including the second embodiment and variants thereof, of the invention with reference to FIGS. 6A to 8B. FIGS. 6A to 8B illustrate the assembly A2 of the second embodiment. FIGS. 6A to 7B and 8A to 8B show the Y-Y' direction similarly to the assembly A1. FIGS. 6A, 6B, 7B, and 8A to 8B show the Z-Z' direction similarly to the assembly A1. FIGS. 6A to 7A and 8A to 8B show the X-X' direction similarly to the assembly A1.

The assembly A2 may have substantially the same configuration as the assembly A1, except for the difference from the assembly A1 in that a support 200' of the lens L2 includes a support body 210' that is integrated with, and thereby fixed to, the lens body 100. The assembly A2 will now be described focusing on the difference from the assembly A1 and omitting overlapping descriptions.

The support body 210' of the lens L2 is made of the same material as the lens body 100, and extends in the Y' direction from the second face 101b of the lens body 100. The support body 210' includes a second face 210b on the Y'-direction side, a third face 210c on the Z-direction side, and a fourth face 210d on the Z'-direction side.

The fourth face 210d of the support body 210' may be positioned at the same height in the Z-Z' direction as the fourth face 101d of the lens body 100 (see FIG. 7B), but may be positioned on the Z- or Z'-direction side relative to the fourth face 101d of the lens body 100 (not illustrated).

Similarly to the support body 210 of the lens L1, the support body 210' of the lens L2 may or may not be provided with one or more guides 211. Where the single guide 211 or each guide 211 includes the pair of ridges of configuration (4) described above, the pair of ridges extends in the Y' direction from the second face 101b of the lens body 100 of the lens L2, and otherwise has configuration (4) above.

Methods for manufacturing the assembly A2 described above are as follows. The support body 210' of the support 200' integrated with the lens body 100 is prepared. Accordingly, the methods do not include the step of fixing the support body 210 of the support 200 to the lens body 100 included in the methods for manufacturing the assembly A1 described above. Except for this, the methods for manufacturing the assembly A2 are identical to the methods for manufacturing the assembly A1.

The assembly A2 as described above provides technical features and effects similar to the first to seventh technical features and effects of the assembly A1.

Figure 9:
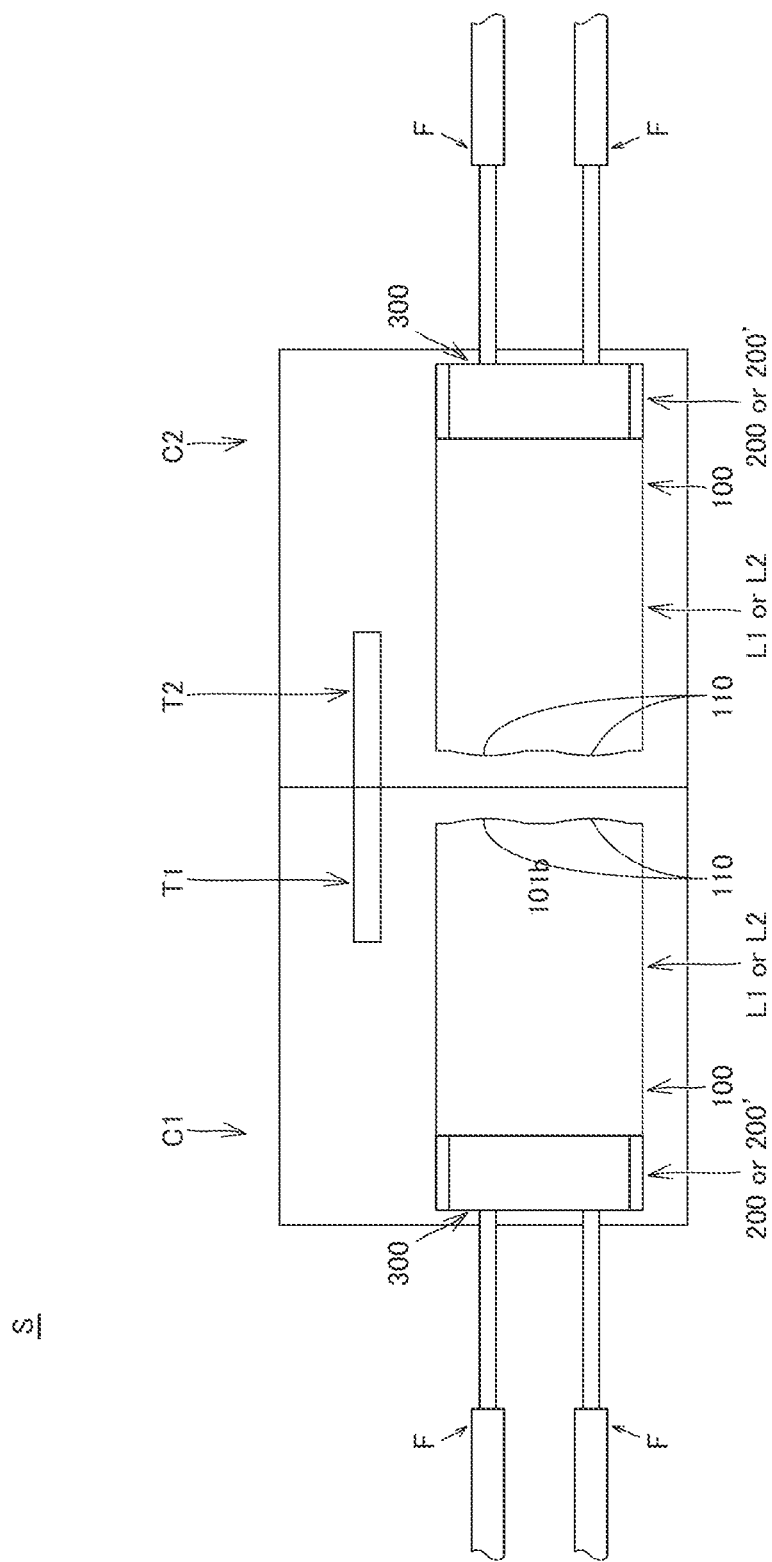
FIG. 9 is a diagram illustrating an optical communication system according to the embodiments of the invention.

Optical Communication System: Hereinafter, an optical communication system S according to various embodiments of the invention will be described with reference to FIG. 9.

The optical communication system S includes a male connector C1 and a female connector C2. The male connector C1 includes the assembly A1 or the assembly A2 (hereinafter referred to as a "first assembly A1 or A2"). The female connector C2 includes the assembly A1 or the assembly A2 (hereinafter referred to as a "second assembly A1 or A2").

The male connector C1 may be configured such that the lens body 100 of the first assembly A1 or A2 is provided with a connection projection. Alternatively, the male connector C1 may further include a first body (not illustrated) of an insulating synthetic resin, and the first body may be configured to hold the lens body 100 of the male connector C1 and provided with a connection projection. The female connector C2 may be configured such that the lens body 100 of the second assembly A1 or A2 is provided with a connection recess. Alternatively, the female connector C2 may further include a second body (not illustrated) made of an insulating synthetic resin, and the second body may be configured to hold the lens body 100 of the female connector C2 and provided with a connection recess.

The connection protrusion of the male connector C1 fits in the connection recess of the female connector C2, so that the male connector C1 and the female connector C2 are connected to each other. In this connected state, the one or more lens portions 110 of the first assembly A1 or A2 of the male connector C1 face the one or more lens portions 110 of the second assembly A1 or A2 of the female connector C2. This allows optical communication between the first assembly A1 or A2 of the male connector C1 and the second assembly A1 or A2 of the female connector C2.

The male connector C1 may further include at least one first terminal T1. The at least one first terminal T1 may be a single first terminal T1 or a plurality of first terminals T1. The one or more first terminals T1 are held in the lens body 100 or the first body of the male connector C1 such that a distal portion or portions of the one or more first terminals T1 are protruded or exposed from the connection projection. The female connector C2 may further include at least one second terminal T2. The at least one second terminal T2 may be a single second terminal T2 or a plurality of second terminals T2. The one or more second terminals T2 are held in the lens body 100 or the second body of the female connector C2 such that a distal portion or portions of the one or more second terminals T2 are protruded or exposed from the connection recess.

In the connection state, the one or more first terminals T1 of the male connector C1 are in contact with, and electrically connected to, the one or more second terminals T2 of the female connector C2. In this case, not only optical communication but also electrical communication can be performed between the male connector C1 and the female connector C2.

The optical communication system S may include neither the male connector C1 nor the female connector C2, but may include the first assembly A1 or A2 and the second assembly A1 or A2. The one or more lens portions 110 of the first assembly A1 or A2 face the one or more lens portions 110 of the second assembly A1 or A2. This allows optical communication between the first assembly A1 or A2 and the second assembly A1 or A2.

It should be noted that the assembly and lens described above are not limited to the above-described embodiments, but may be modified in any manner within the scope of the claims as detailed below.

Where the or each guide 211 of the support body 210, 210' of the support 200, 200' is the groove of configuration (3-1), (3-2), and (3-3) described above, the or each guide 211 may be spaced in the Y-Y' direction from the or a corresponding holding hole 120. The distance in the Y-Y' direction between the or each guide 211 of the support body 210, 210' and the or a corresponding holding hole 120 is smaller than the dimension in the Y-Y' direction of the first portion F1 of the or a corresponding fiber F. Between the or each guide 211 of the support body 210, 210' and the or a corresponding holding hole 120 may be provided a recess (not illustrated) for avoiding an interference with the first portion F1 of the or a corresponding optical fiber F when the first portion F1 of the or a corresponding optical fiber F is guided by the or each guide 211. Also, the dimension in the Z-Z' direction of the or each guide 211 (depth dimension of the groove) may be extremely small, i.e., so small that the or each guide 211 cannot guide the first portion F1 of the or a corresponding optical fiber F in the X-X' direction.

Where the or each guide 211 of the support body 210, 210' of the support 200, 200' has the pair of ridges of configuration (4) described above, the pair of ridges of the or each guide 211 may be spaced in the Y-Y' direction from the second face 101b of the lens body 100. The distance in the Y-Y' direction between the pair of ridges of the or each guide 211 and the second face 101b of the lens body 100 is smaller than the dimension in the Y-Y' direction of the first portion F1 of the or a corresponding optical fiber F.

The lens L1 or L2 of any of the above aspects may be configured, in use, such that the at least one lens portion 110 is placed so as to face and be optically connected to, an electronic component, such as an opto-electric or electro-optical transducer, or such that the at least one lens portion 110 is placed so as to face a mirror or other elements.

In any of the above-described embodiments or variants, the at least one optical fiber F may be a single optical fiber F, and the at least one lens portion 110 and the at least one holding hole 120 of the lens body 100 of the lens L1 or L2 may be a plurality of lens portions 110 and a plurality of holding holes 120, respectively. In this case, the assembly and lens may be configured as follows. The first portion F1 of the single optical fiber F is securely received in one of the holding holes 120. Where the at least one guide 211 is the single guide 211, the first portion F1 of the single optical fiber F is received into the guide 211 and then guided into one of the holding holes 120. Where the at least one guide 211 is a plurality of guides 211, the number of which is equal to the number of the holding holes 120, the first portion F1 of the single optical fiber F is received into one of the guides 211 and then guided into one of the holding holes 120. With the first portion F1 of the single optical fiber F is securely received in the one of the holding holes 120, the single guide 211 or the one of the guides 211 supports the second portion F2 of the single optical fiber F from the Z'-direction side and restricts the second portion F2 in position from the X- and X'-direction sides, or alternatively supports the second portion F2 of the single optical fiber F from the Z'-, X-, and X'-direction sides, in a manner as described in (3-1), (3-2), (3-3), or (4) above. Also in these cases, the single guide 211 or the plurality of guides 211 may be omitted.

In any of the above-described embodiments or variants, the at least one optical fiber F may be a plurality of optical fibers F, the at least one lens portion 110 and the at least one holding hole 120 of the lens body 100 of the lens L1 or L2 may a plurality of lens portions 110 and a plurality of holding holes 120, respectively, that are more in number than the plurality of optical fibers F. The first portions F1 of the plurality of optical fibers F are securely received respectively in more than one (fewer than the number of all the holding holes 120 and equal to the number of the optical fibers F) of all the holding holes 120. Where the at least one guide 211 is a plurality of guides 211, the number of which is equal to the number of the plurality of holding holes 120, the first portions F1 of the plurality of optical fibers F are received respectively into more than one (fewer than the number of all the holding holes 120 and equal to the number of the optical fibers F) of all the guides 211 and then guided respectively into more than one (fewer than the number of all the holding holes 120 and equal to the number of the optical fibers F) of all the holding holes 120. With the first portions F1 of the plurality of optical fibers F are securely received respectively in the more than one (fewer than the number of all the holding holes 120 and equal to the number of the optical fibers F) of all the holding holes 120, the more than one (fewer than the number of all the holding holes 120 and equal to the number of the optical fibers F) of all the guides 211 respectively support the second portions F2 of the plurality of optical fibers F from the Z'-direction side and restrict the second portions F2 in position from the X- and X'-direction sides, or alternatively support the second portions F2 of the plurality of optical fibers F from the Z'-, X-, and X'-direction sides, in a manner as described in (3-1), (3-2), (3-3), or (4) above. Also in these cases, the plurality of guides 211 may be omitted.

The assembly A1 or A2 described above is not limited to the configuration in which the one or more lenses L1 or L2 are attached to the first portion or portions F1 and the second portion portions F2 on the Y-direction side of the one or more optical fibers F. There may be an additional lens or lenses L1 or L2 attached to the first portion or portions F1 and the second portion portions F2 on the Y'-direction side of the one or more optical fibers F. The assembly A1 or A2 may be configured such that the number of the lenses L1 or L2 attached to t the first portion or portions F1 and the second portion portions F2 on the Y-direction side of the one or more optical fibers F is equal to, or different from, the number of the lenses L1 or L2 attached to the first portion or portions F1 and the second portion portions F2 on the Y'-direction side of the one or more optical fibers F. The first portion or portions F1 on the Y'-direction side have the same configuration as the first portion or portions F1 on the Y-direction side, except that the first portion or portions F1 on the Y'-direction side have the end face or faces F11 on the Y'-direction side of the one or more optical fibers F. The second portion or portions F2 on the Y'-direction side have the same configuration as the second portion or portions F2 on the Y-direction side, except that the second portion or portions F2 on the Y'-direction side are positioned on the Y'-direction side relative to the first portion or portions F1 on the Y'-direction side of the one or more optical fibers F.

REFERENCE SIGNS LIST

A1, A2: assembly
F: optical fiber
10: core; 20: cladding; 30: sheath; F1: first portion; F11: end face; F12: outer peripheral face; F2: second portion; F22: outer peripheral face; AX1: optical axis of optical fiber
L1, L2: lens
100: lens body; 101a: first face; 101b: second face; 101c: third face; 101d: fourth face; 110: lens portion; 120: holding hole; 121: hole body; 121a: bottom face; 121b: peripheral face; 122: guide hole; 122a: peripheral face of guide hole; 122b: peripheral edge; AX2: optical axis of
lens portion
200, 200': support; 210, 210': support body; 210a: first face; 210b: second face; 210c: third face; 210d: fourth face; 211: guide; 220: fixing portion; 220a: first face; 220b: second face; 220c: third face; 220d: fourth face
300: bonding member
α: phantom line
S: optical communication system
C1: male connector; C2: female connector
A1 or A2: first assembly or second assembly
T1: first terminal; T2: second terminal

What is claimed is:

1. A lens comprising:
a lens body including at least one lens portion and at least one holding hole for holding at least one optical fiber; and
a support, wherein
the or each lens portion is provided in the lens body so as to be positioned on one side in a first direction relative to the or a corresponding holding hole,
the or each holding hole is provided in the lens body, is a blind hole of cylindrical shape extending in the first direction and opening out to the other side in the first direction, and includes a bottom face on the one side in the first direction and a peripheral face of tubular shape with a circular section extending from the bottom face to the other side in the first direction,
a central axis of the or each holding hole is positioned on a phantom line extending in the first direction through an optical axis of the or a corresponding lens portion,
the or each holding hole has a cross-sectional diameter along second and third directions that is substantially equal to a cross-sectional outer diameter along the second and third directions of a first portion of the or a corresponding optical fiber, wherein the first portion is a distal portion on the one side in the first direction of the or each optical fiber, the first direction is an axial direction of the central axis of the at least one holding hole, the second direction is substantially orthogonal to the first direction, and the third direction is substantially orthogonal to the first and second directions, the support includes a support body fixed to the lens body, positioned on the other side in the first direction relative to the lens body, and positioned at least partly on one side in the second direction relative to the at least one holding hole of the lens body, and
with the first portion of the or each optical fiber securely received in the or a corresponding holding hole, the bottom face of the or each holding hole abuts an end face on the one side in the first direction of the first portion of the or a corresponding optical fiber, the peripheral face of the or each holding hole partly abuts an outer peripheral face of the first portion of the or a corresponding optical fiber, and the support body supports a second portion of the or each optical fiber from the one side in the second direction, the second portion being positioned on the other side in the first direction relative to the first portion of the or a corresponding optical fiber.

2. The lens according to claim 1, wherein the support body is provided with at least one guide, the or each guide being configured to guide the first portion of the or a corresponding optical fiber along the first direction into the or a corresponding holding hole, the at or each guide is positioned on the other side in the first direction relative to the or a corresponding holding hole, and with the first portion of the or each optical fiber securely received in the or a corresponding holding hole, the or each guide of the support body supports the second portion of the or a corresponding optical fiber from the one side in the second direction and guides the second portion in the third direction.

3. The lens according to claim 2, wherein the or each guide is a long groove extending in the first direction, and opens out to the other side in the second direction and to the other side in the first direction.

4. The lens according to claim 2, wherein a dimension in the first direction of the or each guide and a dimension in the first direction of the support body are larger than a dimension in the first direction of the or a corresponding holding hole.

5. The lens according to claim 3, wherein a dimension in the first direction of the or each guide and a dimension in the first direction of the support body are larger than a dimension in the first direction of the or a corresponding holding hole.

6. The lens according to claim 2, wherein the or each holding hole includes:
    a hole body including the bottom face and the peripheral face of the or each holding hole, and
    a guide hole of a truncated-cone shape extending from the hole body to the other side in the first direction, the hole body of the or each holding hole has a cross-sectional outer diameter along the second and third directions that is substantially equal to a cross-sectional outer diameter along the second and third direction of the first portion of the or a corresponding optical fiber, and the guide hole of the or each holding hole has a cross-sectional outer diameter along the second and third directions that gradually decreases in moving to the one side in the first direction.

7. The lens according to claim 3, wherein the or each holding hole includes:
    a hole body including the bottom face and the peripheral face of the or each holding hole, and
    a guide hole of a truncated-cone shape extending from the hole body to the other side in the first direction, the hole body of the or each holding hole has a cross-sectional outer diameter along the second and third directions that is substantially equal to a cross-sectional outer diameter along the second and third direction of the first portion of the or a corresponding optical fiber, and the guide hole of the or each holding hole has a cross-sectional outer diameter along the second and third directions that gradually decreases in moving to the one side in the first direction.

8. The lens according to claim 1, wherein the lens body includes a first face on the one side in the first direction, a second face on the other side in the first direction, a third face on the one side in the second direction, and a fourth face on the other side in the second direction, the support body includes a first face on the one side in the first direction, a second face on the other side in the first direction, a third face on the one side in the second direction, and a fourth face on the other side in the second direction, and the support body is formed separately from the lens body, the support further includes a fixing portion extending from the first face of the support body to the one side in the first direction, and the fixing portion is fixed to the fourth face of the lens body, and the support body is fixed to the second face of the lens body.

9. The lens according to claim 1, wherein the support body is integrated with the lens body and extends from the lens body to the other side in the first direction.

10. The lens according to claim 1, wherein the lens body is made of a synthetic resin.

11. The lens according to claim 2, wherein the at least one lens portion, the at least one holding hole, and the at least one guide comprise an equal number of a plurality of lens portions, a plurality of holding holes, and a plurality of guides, respectively, the lens portions are arranged at spaced intervals in the third direction, the holding holes are arranged at spaced intervals in the third direction and positioned on the other side in the first direction relative to the respective lens portions, and the guides are arranged at spaced intervals in the third direction and positioned on the other side in the first direction relative to the respective holding holes.

12. The lens according to claim 3, wherein the at least one lens portion, the at least one holding hole, and the at least one guide comprise an equal number of a plurality of lens portions, a plurality of holding holes, and a plurality of guides, respectively, the lens portions are arranged at spaced intervals in the third direction, the holding holes are arranged at spaced intervals in the third direction and positioned on the other side in the first direction relative to the respective lens portions, and the guides are arranged at spaced intervals in the third direction and positioned on the other side in the first direction relative to the respective holding holes.

* * * * *